(12) United States Patent
Baghani et al.

(10) Patent No.: US 11,790,058 B2
(45) Date of Patent: *Oct. 17, 2023

(54) AUTOMATED ROLE MANAGEMENT FOR RESOURCE ACCESSING CODE

(71) Applicant: Amazon Technologies, Inc., Seattle, WA (US)

(72) Inventors: Ali Baghani, Vancouver (CA); Patrick MacLaine Compton, Kirkland, WA (US); Andrew Katz, Vancouver (CA); Gabriel Mastey, Vancouver (CA); Adam Alexander Emerson Wong, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,366

(22) Filed: Jul. 22, 2022

(65) Prior Publication Data
US 2022/0358190 A1 Nov. 10, 2022

Related U.S. Application Data

(63) Continuation of application No. 16/363,998, filed on Mar. 25, 2019, now Pat. No. 11,397,794.

(51) Int. Cl.
*G06F 21/12* (2013.01)
*G06F 21/44* (2013.01)
*G06F 8/33* (2018.01)

(52) U.S. Cl.
CPC .............. *G06F 21/125* (2013.01); *G06F 8/33* (2013.01); *G06F 21/44* (2013.01)

(58) Field of Classification Search
CPC .......... G06F 21/125; G06F 21/44; G06F 8/33
USPC ......................................................... 726/26
See application file for complete search history.

(56) References Cited

U.S. PATENT DOCUMENTS

| | | | |
|---|---|---|---|
| 7,051,366 B1 | 5/2006 | LaMacchia et al. | |
| 7,568,217 B1 * | 7/2009 | Prasad | H04L 63/102 726/3 |
| 9,137,265 B2 | 9/2015 | Chari et al. | |
| 9,934,399 B2 | 4/2018 | Roth et al. | |

(Continued)

*Primary Examiner* — Michael S McNally
(74) *Attorney, Agent, or Firm* — Robert C. Kowert; Kowert, Hood, Munyon, Rankin & Goetzel, P.C.

(57) ABSTRACT

Computer systems and methods are disclosed to implement a role manager that automatically analyzes code accessing various resources to generate a role with the necessary resource permissions to execute the code. In embodiments, the role manager may be implemented as part of a workflow orchestration or resource provisioning system that employs code requiring access to different types of resources. In embodiments, the role manager may analyze a code segment to identify the different resources accessed by the code segment and the permissions needed for each access, and generate a role that has the needed permissions. In embodiments, the role manager may automatically manage these roles based on changes to associated code segments. Advantageously, the disclosed role manager removes the need to manually create roles need by code segments ahead of time, and creates roles with minimal privileges required for the code, thereby simplifying achievement of system security.

20 Claims, 15 Drawing Sheets

(56) References Cited

U.S. PATENT DOCUMENTS

| | | | |
|---|---|---|---|
| 10,771,468 B1* | 9/2020 | Walker | H04L 63/0281 |
| 11,397,794 B1 | 7/2022 | Baghani et al. | |
| 2002/0188869 A1* | 12/2002 | Patrick | G06F 21/6245 |
| | | | 726/4 |
| 2003/0040813 A1* | 2/2003 | Gonzales | H04L 12/282 |
| | | | 700/20 |
| 2004/0225893 A1* | 11/2004 | Ng | G06F 21/6227 |
| | | | 717/114 |
| 2006/0277595 A1* | 12/2006 | Kinser | G06F 21/6218 |
| | | | 726/3 |
| 2009/0235334 A1* | 9/2009 | Park | H04L 63/102 |
| | | | 726/4 |
| 2013/0326588 A1* | 12/2013 | Jain | G06F 21/41 |
| | | | 726/4 |

* cited by examiner

PREVIEW ROLE 660 code view 632

```
{
  Start: "VM cleanup",
  States: {
    "VM cleanup" {
      Action: "vmexec:run",
      Cluster: "myCluster",
      Task: "cleanupTask",
      Next: "Write database"
    },
    "Write database" {
      Action: "database:write",
      Database: "BobDatabase",
      TableName: "statusTable",
``` graph view 634

START → VM cleanup → Write database → Publish event role description table 670

ROLE NAME: MY_CLEANUP_ROLE

| RESOURCE 672 | POLICY TEMPLATE 674 | TEMPLATE DESCRIPTION 676 | POLICY 678 |
|---|---|---|---|
| myCluster | VM_ADMIN (VIEW) | Allows logging on to VM instances in account | (VIEW) |
| cleanupTask | VM_TASKS (VIEW) | Allows task operations on VM instances in your account | (VIEW) |
| statusTable | DB_TABLES (VIEW) | Allows table operations in database | (VIEW) |

PREV 680    SAVE 682

*FIG. 6D*

AUTOMATED ROLE MANAGEMENT FOR RESOURCE ACCESSING CODE

This is a continuation of U.S. patent application Ser. No. 16/363,998, filed Mar. 25, 2019, which is hereby incorporated by reference herein in its entirety.

BACKGROUND

Cloud computing is increasingly being used to provide various computing services to users. Cloud computing allows for infrastructure flexibility, fast deployment of applications and data, cost control, and adaptability. Cloud-based service provider networks allow customers to access computing resources hosted in a remote network (e.g., virtual servers, databases, applications, etc.) without having to manage computing infrastructure of their own. Cloud-based service providers may allow customers to purchase or lease the infrastructure necessary for their needs. In some cases, these service providers may intelligently manage the amount of resources provided to clients by dynamically scaling these resources up or down based on observed needs of the individual clients.

Access to resources in a service provider network may be managed through permissions, secrets, and other tools such as usernames and passwords, keys, and other credentialing information. However, the management of resource permissions for complex workflows remain a difficult challenge. Due in part to the complexity and changing nature of the resource needs of these workflows, permissions are often granted to these workflows in blanket fashion. The practice of broadly granting permissions to these workflows reduces the overall security of user systems and defeats the purpose of the security control mechanisms offered by the service provider. Current and prior permission management systems do not provide sufficient intelligence and usability needed to encourage proper use of such security control mechanisms.

BRIEF DESCRIPTION OF THE DRAWINGS

FIG. 6A to 6D depict example graphical user interfaces (GUIs) that implement user interfaces of a role manager, according to some embodiments.

Figure 1:
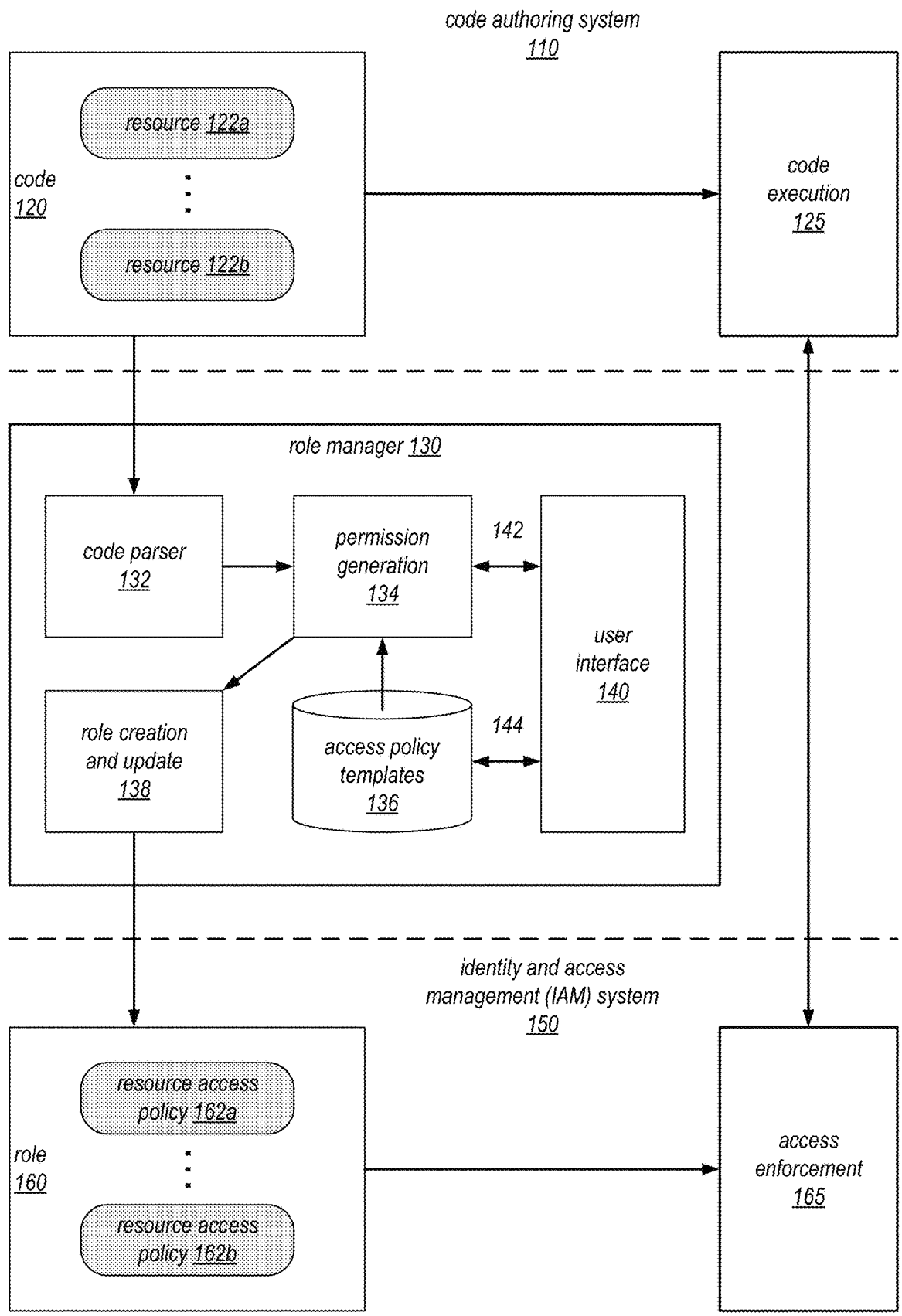
FIG. 1 is a block diagram illustrating an example role manager that automatically manages roles with permissions for executing code, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods are disclosed to implement an automated role management system to analyze code that specify a set of resources, generate a role with the resource permissions needed for accessing the resources, and manage the role in response to code changes.

Embodiments of the role management system disclosed herein allow users to easily create roles with a limited set of permissions that are sufficient to execute a segment of code (e.g. code specifying a workflow) that uses different permission-restricted resources. In some embodiments, the roles may be created and stored in an identity and access management (IAM) system, which may store the identities of individual users for a system as well as permissioned roles that can be assumed by the users. In some embodiments, the role management system may programmatically examine the code to identify the different resources requiring permissions that are specified within the code. In some embodiments, the role management system may generate a role with sufficient permissions to access these resources. In embodiments where the code can refer to many different types of resources (e.g., different services provided by a service provider network), the role may be generated using resource-specific templates written in accordance with the different resources' security control regimes. In some embodiments, the role manager may recognize that a particular resource accessed in the code is a resource that is dynamically determined at runtime, and accordingly, generate permissions for the dynamic resource that are sufficient to cover the different resources that the dynamic resource may resolve to at runtime.

In some embodiments, the disclosed role management system may automatically manage the roles created for different code segments in the system. For example, the role manager may automatically generate roles for code segments, and in some embodiments, automatically update roles or generate new roles when the code is changed. In some embodiments, the role management system may maintain a registry that indicates the associations among different roles and different codes. Accordingly, the role management system may generate a warning or user notification when changes to a role may potentially impact one or more code segments that rely on that role. In some embodiments, such roles may be fully managed by the role management system, so that they cannot be directly modified by ordinary users of the system.

In some embodiments, the role management system may be implemented as part of an IAM system. In other embodiments, the role management system may be implemented as a standalone system or as part of a code authoring or execution system. In some embodiments, the role management system may provide one or more graphical user interfaces (GUIs). In some embodiments, the GUI of the role management system may be incorporated into the GUI of a code authoring environment. Accordingly, a code segment and its associated roles (and resource permissions) may be viewed together in the code authoring environment. In some embodiments, the GUI of the role management system or the code authoring system may allow a user to generate a new role for a code segment, select a different role for a code segment, or make modifications to an existing role. In some embodiments, GUI may provide user notifications or warnings when changes to a code segment impacts an associated role, or when changes to a role impacts one or more associated code segments.

Advantageously, embodiments of the disclosed role management system improve upon conventional computer systems to a number of technical benefits, including the following. In some embodiments, the role management system is able to automatically generate roles with sufficient access policies for each code segment. These roles can be generated at the same time as the code is being authored, and thus avoids the tedius step of having to requesting access to resources separately from the code authoring process. Moreover, the automated generation and maintenance of permission roles in the described fashion relieves the code author from having to understand the details of the permission model of each resource type, and also avoids possible user errors that may be caused by manual specification of resource permissions. In some embodiments, the disclosed role generation and management features are especially helpful where the resources permissions are distributed across a number of different permission stores. In some embodiments, the role manager may be configured with interfaces to obtain multiple sets of permissions in multiple remote systems, which greatly simplifies the existing process for obtaining permissions for complex workflows. Additionally, embodiments of the role manager may be configured to generate roles conservatively, in some cases, to have only the minimal amount of privileges needed for each code segment. In this manner, the code segments are not granted with excessively broad permissions (which may create unintended security risks), and the overall security of the system can be more easily achieved.

As may be appreciated by those skilled in the art, the role management system described herein introduces a number of novel features to improve upon the functioning of conventional computer systems for controlling access to resources, which are not limited to the features discussed above. Additional features and benefits of the role management system are described below, in connection with the drawings and their descriptions.

FIG. 1 is a block diagram illustrating an example role manager that automatically manages roles with permissions for executing code, according to some embodiments. As shown, a role manager 130 is depicted in the figure, which accepts as input code 120 and generates a role 160 for the code. In some embodiments, the role manager 130 may be implemented using one or more computer systems. In some embodiments, the role manager 130 may be implemented as a service accessible via a service API, and may be implemented using hardware provided within a network-accessible service provider network. In some embodiments, the role manager 130 may be implemented as part of the code authoring system 110. In some embodiments, the role manager 130 may be implemented as part of the identity and access management (IAM) system 150.

As shown, in some embodiments, the code 120 may be received from the code authoring system 110. In other embodiments, the code 120 may be received from other types of systems, such as a code repository, a code generator, etc. In some embodiments, the code 120 may comprise a sequence of instructions to be executed by a computer. In some embodiments, the code 120 may not be specified as individual executable instruction, but rather, in a specification or configuration language. In some embodiments, the code 120 may be stored in a textual form, which may be readable by humans. In some embodiments, the code 120 may comprise a binary or intermediary code formatted for machine execution or interpretation. In some embodiments, the code 120 may be expressed in a programming or scripting language that specify instructions to be performed by a computer. In some embodiments, the programming or scripting language may be an imperative language (e.g., Java) that specifies changes in a program's state. For example, the code may represent states in a state machine specification, where each state or step specifies one or more actions to be performed, and the states specify transition conditions to other states. In some embodiments, the state machine may be used to define a complex workflow involving actions in many different computing systems. In some embodiments, the code 120 may be a specification language used to specify one or more configuration settings (e.g., for a configuring a computer system). For example, the code may indicate a number of computing resources to be provisioned or initialized, based on a particular ordering and with different configuration parameters for each computing resource. In some embodiments, the code 120 may be included in a programmatic request or response to API, such as a service API.

In some embodiments, the code authoring system 110 may implement a code development environment that that allow users to create and modify code such as code 120. In some embodiments, the code authoring system 110 may allow users to build, execute, and/or debug code. For example, code 120 may be executed via a code execution module or platform 125, as shown. The code authoring system 110 may be implemented as a local application or a remote service or web application, depending on the embodiment. In some embodiments, the code authoring system 110 may be part of a workflow orchestration system, a resource deployment or provisioning system, or some other type of system that allow users to write or execute resource-accessing code.

As shown, the code 120 may refer to or access a number of resources 122a and 122b. Access to such resources 122 may be restricted under different permission models. For example, a resource 122 may a remote server that requires a permission for connection. As another example, a resource 122 may be a database instance or table that requires read or write access. As another example, a resource 122 may be a running instance of a service (e.g. a virtual machine provisioning service) that requires special access for particular types of service actions (e.g. launching a virtual machine instance). In some embodiments, accesses to these different resources may be specified in the code according to the particular grammar or syntax of the code 120.

As shown, the code 120 may be consumed by the role manager 130 and used to generate a role 160 with the needed permissions for executing the code or to access the resources. In some embodiments, the role manager 130 may include a code parser 132 that can analyze to code 120. In some embodiments, the parsing may fully reduce the code to an abstract syntax tree. In some embodiments, the parsing may be more limited, and only recognize individual references to the resources 122 in the code. In some embodiments, the parsing may simply involve a pass of the code to match for particular naming patterns for resources specified in the code. For example, in some embodiments, individual reference to external resources in the code may be identified based on a common naming scheme (e.g., a uniform resource locator or URL), and the code parser 132 may scan the code for these resource URLs.

As shown, in some embodiments, the code parser 132 may provide any identified resources in the code 120 to a permission generation module 134. In some embodiments, the permission generation module 134 may generate permission or access policies for different instances of resources seen in the code 120. In some embodiments, the permissions granted for each resource instance 122 may depend on the type of resource. In some embodiments, the permissions granted may also depend on the type of access that the code is performing on the resource (e.g., whether the code is writing a resource or reading from a resource, etc.). In some embodiments, the permission generator 134 may generate the access policies for each resource 122 in a textual format, and the different generated access policies may be concatenated or combined to produce an overall access policy for the role 160.

In some embodiments, as shown, the permission generator 134 may employ a set of access policy templates 136 to generate the access policies for the role. In some embodiments, the permission generator 134 may be implemented using a set of configurable rules to select the correct template for each type of resource, and then the permissible actions for each resource from its template. In some embodiments, the access policy templates 136 may be stored as text files or in a data store that allows the different templates to be identified according to resource type or other runtime parameters.

As shown, in some embodiments, the role manager 130 may implement a user interface 140. Depending on the embodiment, the user interface may be part of the user interface of the code authoring system 110 or the IAM system 150. In some embodiments, the user interface may be a GUI. In some embodiments, the user interface may be a text-based or command-line interface. In some embodiments, the user interfaces may be an API or web-based call interface, which may be accessed via one or more invocations from other programmed components.

As shown, in some embodiments, the user interface 140 may be used to configure 142 the operating rules and policies of the permission generator 134. In some embodiments, the user interface 140 may be used to configure, add, remove, or modify 144 the templates in the access policy templates repository 136. In some embodiments, the user interface 140 may also allow users to provide explicit directions 142 to the role manager 130 for management of individual roles. For example, in some embodiments, the role generation process for a code segment may be a partially interactive process, where the user can make a number of manual decisions via the user interface. In some embodiments, the user interface 140 may also be used by the role manager to provide 142 feedback to the user about particular role management activities. For example, in some embodiments, the user interface 140 may generate warnings or notifications to users about different managed roles or code segments tracked by the role manager.

As shown, in some embodiments, the role manager 130 may implement a role creation and/or update module 138, which may be responsible for interfacing with the IAM system 150 to create or update roles stored in the IAM system. In some embodiments, a role (such as role 160) may be an IAM entity that defines a set of permissions for resources. In some embodiments, these roles may be assumed by individual users, user groups, or user accounts known to the system. In some embodiments, roles may be granted to users without having to share long-term access keys used to access resources. In this manner, IAM roles allow users to easily receive different sets of privileges needed to perform different tasks within the system. For example, in some embodiments, the role 160 may be associated with a particular piece of segment of code (e.g. code 120), and grant any user the privileges needed to access resources specified by the code 120. In some embodiments, permission roles may be associated with individual resource instances. In some embodiments, the role manager 130 may generate multiple resource-based roles for a single code segment 120.

Depending on the embodiment, the role creation and update module 138 may interface with the IAM system 150 using a variety of different mechanisms. In some embodiments, the module 138 may send one or more requests to the IAM system 150, for example via an API exposed by the IAM system. In some embodiments, the module 138 may generate a script or specification file that contain a definition for the role 160. In some embodiments, the script or specification may be provided to the IAM system to be executed. In some embodiments, the IAM system 150 may allow for configuration of the role 160, for example, according to one or more provided access policies. In some embodiments, the IAM system may allow the role manager 130 to search for the roles that it has generated based on a special naming convention employed by the role manager 130. For example, the role manager 130 may embed the name of the code segment 120 in the name of the role 160, so that the role can be easily looked up from the IAM system 150.

As shown, in some embodiments, the role 160 may be associated with different resource access policies 162a and 162b. In some embodiments, each resource access policy 162 may include one or more permission grants for a particular resource instance. For example, a first resource access policy may grant a set of permissions for a first database instance, and a second access policy may grant a different set of permissions for a second database instance. As discussed, in some embodiments, each policy granted to the role may be generated from a policy template in the templates repository 136. In some embodiments, the specific permissions granted in each policy may depend on how the resource is accessed by the code 120, or other runtime parameters. In some embodiments, the roles and policies may be expressed and stored in a text-based role or policy specification language, for example, in JavaScript Object Notation (JSON). In some embodiments, the specification language may include executable statements that can be individually executed, for example, via a command-line console or interpreter. In some embodiments, textual specification of the roles and policies may be modified directed by users, or indirectly via one or more GUI tools.

In some embodiments, the role manager 130 may also associate roles with the codes that the roles were generated for. In some embodiments, the role manager 130 may implement a registry that associate roles and codes. In some embodiments, a single role may be granted to multiple code segments. In some embodiments, multiple roles may be associated with a single code segment. In some embodiments, changes to code segments (which potentially changes their resource access scope) may cause their associated roles to be automatically updated, different roles to be assigned, or new roles to be automatically generated. In some embodiments, user warnings or notifications may be generated, for example via the user interface 140, when an associated role or code segment changes, indicating that the change may cause a mismatch between a code segment and its associated permission role.

The IAM system 150 may be a system that stores information about recognized users or other entities in a system to control access to resources in the system. In some embodiments, the IAM system 150 may be used by many different other systems to define resource permissions in these systems and grant and enforce resource permissions of the systems. In some embodiments, the IAM system 150 may be implemented as a service within a network-accessible service provider network. In some embodiments, in addition to providing permission roles, the IAM system may also store user identity information and authenticate users. In some embodiments, the IAM system may maintain user groups, which may have a common set of privileges. In some embodiments, the IAM system may maintain principals, which are entities that can make a request to a resource. The requests may be authorized based on a context of the request, which includes identity of the principal. In some embodiments, the IAM system may maintain which users or principals are granted which roles and enforce resource accesses based on the role assignments.

As shown, in some embodiments, the IAM system 150 may implement an access enforcement module or subsystem 165. In some embodiments, when an authenticated user or principal makes an access request to a resource, the request may first be routed to the IAM system, which verifies that the user or principal has the permissions (i.e., has been authorized) to use the resource in the manner requested. For example, the IAM system 150 may verify that the user or principal is on an access control list, or that the user has been granted the appropriate roles or permission policies for the request, or that the request context associated with the principal meets an access policy. In some embodiments, the verification performed by the IAM system may include a complex series of evaluations, which may involve checking for various rules and runtime conditions. In some embodiments, if the user or principal request is verified, the IAM system may provide an access key for accessing the resource. In some embodiments, the access key may not be explicitly provided to users. In some embodiments, the resource access key may only be handled by the IAM, which may attach the key to the verified request, before the request is forwarded to the resource. In some embodiments, some or all of the functionality in the access enforcement module 165 may be implemented by the resources themselves. In some embodiments, as shown, the access enforcement module 165 may be invoked during code execution, for example by the code execution module 125, to perform resource access during execution.

As may be understood, by employing the role manager 130, authors and users of code that specifies resources such as code 120 do not have to separately or manually specify the permissions needed for the code. Instead, a role 160 with the needed permissions may be automatically generated for the code in the IAM system. Subsequently, the role manager 130 may perform various management actions on behalf of the user, to keep the generated role will up-to-date with any changes to the code. The role manager 130 thus dramatically simplifies the security configuration process for these code segments, which may refer to a large number of resources. For example, the automation allows permission roles to be generated and updated in real-time as the code is being changed. Moreover, by adopting appropriate permission generation rules and policies, the generated roles may be granted only a narrow set of permissions, for example, only a minimal set of permissions that are needed for the code to execution. Accordingly, the role manager 130 may be used to limit the scope of permissions that are granted to various executing codes, which encourages appropriate granting of permissions within the system and improves the overall security of the system.

Figure 2:
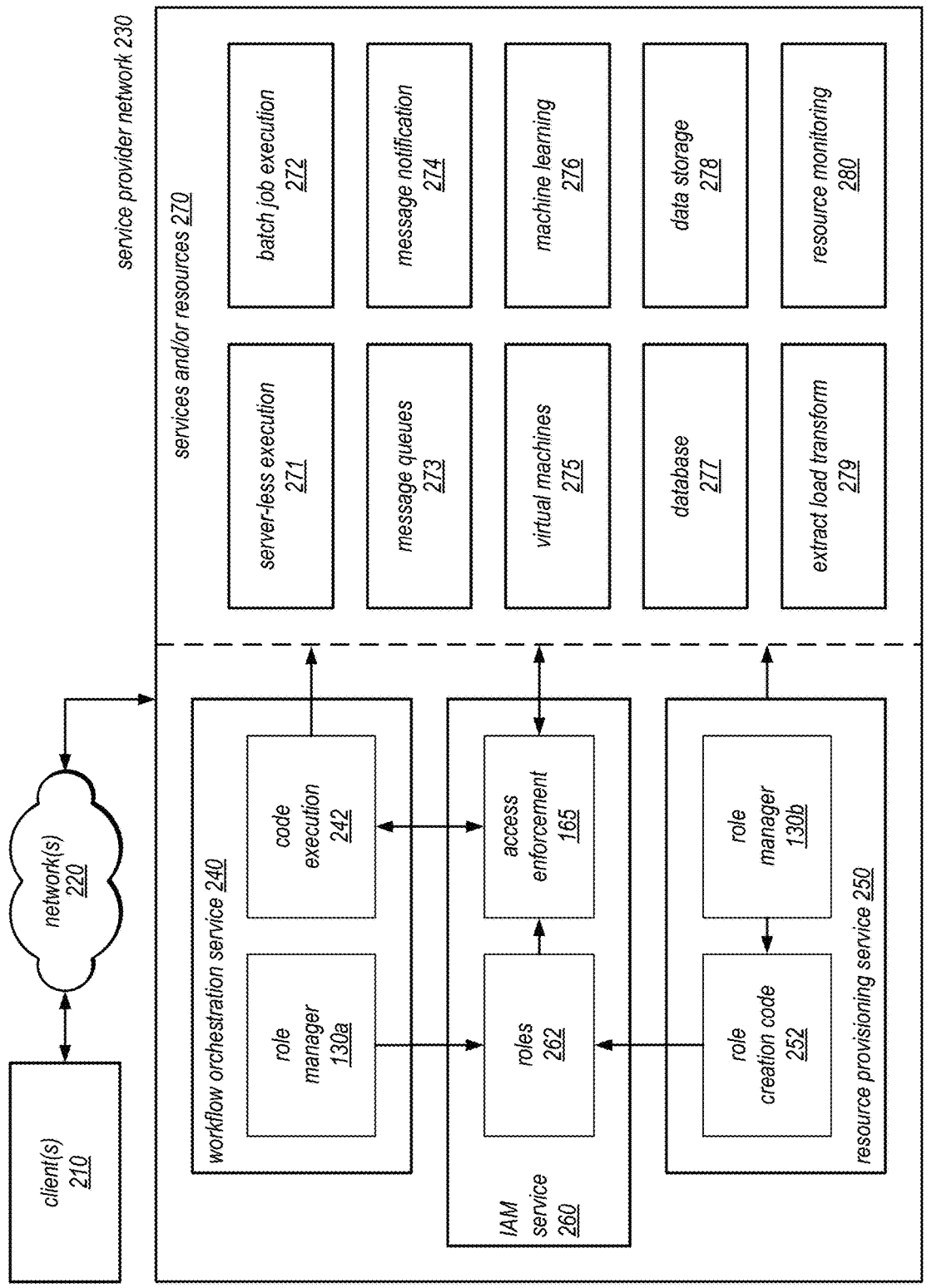
FIG. 2 is a block diagram illustrating an example implementation of a role manager within services in a network-accessible service provider network, according to some embodiments.

FIG. 2 is a block diagram illustrating an example implementation of a role manager within services in a network-accessible service provider network, according to some embodiments. As shown, different embodiments of the role manager discussed in connection with FIG. 1, such as role managers 130*a* and 130*b*, may be implemented in different services, such as services 240 and 250, provided by a service provider network 230. In some embodiments, the service provider network 230 may be a cloud-based service provider system that is accessible via networks 220 by clients 210.

In some embodiments, the service provider network 230 may provide computing resources via one or more computing services to the client(s) 210. The service provider network may be operated by an entity to provide one or more services, such as various types of cloud-based computing or storage services 240, 250, 260, and 271-280. The service provider network may include numerous data centers hosting various resource pools, such as collections of physical and/or virtualized computer servers, storage devices, networking equipment and the like, needed to implement and distribute the infrastructure and services offered by the service provider network. In some embodiments, the service provider network may provide its services using ad hoc computing resources. In some embodiments, these computing resources may be offered to client(s) 210 in units called "instances," such as virtual compute instances.

The client(s) 210 may encompass any type of client configurable to submit requests to the service provider network 230. In some embodiments, a given client 210 may include a suitable version of a web browser or may include a plug-in module or other type of code module configured to execute as an extension to or within an execution environment provided by a web browser. Alternatively, a client 210 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 210 may be configured to generate network-based services requests according to a Representational State Transfer (REST)-style network-based services architecture, a document- or message-based network-based services architecture, or another suitable network-based services architecture. In some embodiments, the service provider network may offer its services as web services, and the client(s) 210 may invoke the web services via published interfaces for the web services. In some embodiments, a client 210 (e.g., a computational client) may be configured to provide access to certain aspects of the services provided in a manner that is transparent to applications implemented on the client(s) 210 utilizing computational resources provided by the service provider network.

In some embodiments, the client(s) 210 may convey network-based services requests to the service provider network via one or more networks 220. In various embodiments, network 220 may encompass any suitable combination of networking hardware and protocols necessary to establish network-based communications between clients 210 and service provider network 230. For example, a network 220 may generally encompass the various telecommunications networks and service providers that collectively implement the Internet. A network 220 may also include private networks such as local area networks (LANs) or wide area networks (WANs) as well as public or private wireless networks. For example, both a client 210 and the service provider network 230 may be respectively provisioned within enterprises having their own internal networks. In such embodiments, the network 220 may include the hardware (e.g., modems, routers, switches, load balancers, proxy servers, etc.) and software (e.g., protocol stacks, accounting software, firewall/security software, etc.) necessary to establish a networking link between the client 210 and the Internet as well as between the Internet and service provider network. In some embodiments, client(s) 210 may communicate with service provider network or CDMS service using a private network rather than the public Internet.

As shown, the role manager 130 discussed in connection with FIG. 1 may be implemented as part of different services (e.g., as role manager components 130*a* and 130*b*), in some embodiments. In some embodiments, the role manager may be implemented as part of a workflow orchestration service 240.

In some embodiments, the workflow orchestration service 240 may implement a platform for uses to create, manage, schedule, and executed workflows on the service provider network, using the various resources and/or services 270 provided by the service provider network. In some embodiments, the workflow orchestration service 240 may define workflows comprised of individual steps. In some embodiments, the workflow may be specified in terms of states in a state machine, where the outcome of one state indicates how the workflow should transition to other states. In some embodiments, such a state machine may be described as a "step function," which defines "steps" or actions to perform at each state, and also the transitions among the different states. In some embodiments, the step function or state machine may be specified using a specification or executable language, which specifies different resources that may be accessed at each step. Accordingly, the role manager 130*a* may be used to analyze these specifications or code sequences, and generate roles 262 to provide permissions for the resources accessed, such as the services or resources shown on the right. As shown, in some embodiments, the workflow orchestration service 240 may implement its own code execution module or system 242, which may execute the state machines using the generated permission roles 262. In some embodiments, the code execution module may execute the state machine code using a "server-less" model, where computing servers used to perform each step in the state machine are not permanently provisioned to the user or service 240, but rather selected on an as-needed or just-in-time basis. As may be understood, under this execution model, computing resources are not dedicated to any particular user when they are not being used, so that they can be freed to perform other tasks in the service provider network.

As shown, the service provider network may implement an IAM service 260, which may perform some or all of the functions of the IAM system 150, as discussed in connection with FIG. 1. In some embodiments, as shown, the IAM service 260 may be used by many different services in the service provider network to maintain and enforce permissions for different aspects of the services. In some embodiments, the IAM service 260 may maintain the roles 262, as shown. These roles 262 may be generated by other services, and be used to execute code in these other services. As shown, the roles 262 may be used by an access enforcement component 165 to enforce access permissions for resources accessed by the code, as discussed in connection with FIG. 1. For example, the access enforcement 165 may verify that a resource accessed by a code that is executed by a user or process that is authorized to perform that type of access. If so, the access enforcement component 165 may provide an access key to the resource to enable the access. If not, the access enforcement component 165 may deny the access and raise and error. In some embodiments, all accessed to resources may be monitored or logged by the access enforcement component.

As shown, in some embodiments, another type of service, such as a resource provisioning service 250, may also use a role manager 130*b* to generate roles 262. In some embodiments, the resource provisioning service 250 may employ a specification or execution language to specify the provisioning or the deployment of various resources for a client of the service provider network. For example, in some embodiments, a deployment specification may indicate a set of virtual computing instances to be provisioned for a client, a set of listener processes to be initialized on the instances, one or more database instances, and a set of tables or database objects to be created in the database. In some embodiments, these provisioning or deployment specifications may include specification to create one or more roles that have the permissions to access the newly provisioned resources. Accordingly, a role manager 130*b* may be used to scan or analyze the specification code and generate role creation code 252 for a role 262 that can be used to access the provisioned resources. In some embodiments, the role creation code may be generated as a recommendation to a user, who may approve or further configure the generated role code 252. In some embodiments, the generated role creation code 252 may be modified via a GUI during the provisioning process.

As may be understood by those skill in the art, embodiments of the role manager 130 describe herein are not limited to just services 240 and 250. Rather, the role manager 130 may be used in a variety of different contexts, to analyze code that accesses resources and generate and manage roles to provide permissions for the code. In some embodiments, the role manager 130 may be used to analyze different types of code. For example, the role manager 130 may generate roles for code written in a generalized programming language such as C, Java, or Python, etc. In some embodiments, the role manager 130 may be applied to various scripts or configuration files. In some embodiments, the role manager 130 may be applied to JSON or XML data, which may be used to encode a variety of data structures, including service calls or inter-system messages. Permission roles may be generated for all these types of codes, so that their later execution can be carried out with sufficient but appropriately restricted permissions.

As shown, the role manager 130 may be used to generate roles for a variety of resources or services 270 provided by the service provider network. In some embodiments, all of these resources or services may be access restricted, so that certain aspects of the services or certain requested actions on the resources require appropriate permissions. In some embodiments, the security model of individual types of services or resources may be added to the role manager via one or more permission role templates and/or permission generation rules. In this manner, the role manager 130 may be easily configurable to operate with any type of resource.

As shown, in some embodiments, one type of resource that may be recognized by the role manager 130 is a server-less execution service 271. In some embodiments, a server-less execution service may provide clients the ability to specify a "function" to be executed on an on-demand basis, using undedicated or computing resources or instances that are triggered by events. For example, a client may specify an event handling function for a rare event to be performed by the server-less execution service, which does not dedicate resources to the handling function until the event arises. In some embodiments, the server-less execution service may be configured to maintain a pool of "frozen" compute instances that can very quickly be awaken to perform any server-less function. In some embodiments, the role manager 130 may also be used to create and manage roles for code used in the server-less execution service 271.

As shown, another type of resource that may be recognized by the role manager 130 is a batch job execution service 272. In some embodiments, the batch job execution service allows users to easily and efficiently run hundreds of thousands of batch computing jobs on the service provider network. The batch job execution service may be configured to dynamically provision the optimal quantity and type of compute resources (e.g., CPU or memory optimized instances) based on the volume and specific resource requirements of the batch jobs submitted. In some embodiments, the batch job execution service may plan, schedule, and execute user batch computing workloads across the full range of service provider services. In some embodiments, the role manager 130 may also be used to create and manage roles for code used in the batch job execution service 272.

As shown, another type of resource that may be recognized by the role manager 130 is a message queuing service 273. In some embodiments, the message queuing service may implement a queue for messages that enables users to send, store, and receive messages between software components in the service provider network at any volume, without losing messages or requiring other services to be available. As may be understood, the queue service may be used to decouple and scale microservices, distributed systems, and serverless applications. In some embodiments, the queuing service may allow users to specify different kinds of queuing policies, such as maximum throughput, best-effort ordering, at-least-once delivery, or exactly-once delivery, etc. In some embodiments, the role manager 130 may also be used to create and manage roles for code seen in the message queuing service 273.

As shown, another type of resource that may be recognized by the role manager 130 is a message notification service 274. In some embodiments, the message notification service may implement a highly available, durable, secure, managed pub/sub messaging service that provides topics for high-throughput, push-based, many-to-many messaging. Using the message topics, message publisher systems can fan out messages to a large number of subscriber endpoints for parallel processing, including endpoints in the message queuing service, server-less execution service, HTTP/S webhooks, and others. Additionally, the message notification service may be used to fan out notifications to end users using mobile push, text messages, and email, etc. In some embodiments, the role manager 130 may also be used to create and manage roles for code seen in the message notification service 274.

As shown, another type of resource that may be recognized by the role manager 130 is a virtual machine service 275. In some embodiments, the virtual machine service may provide secure, resizable compute capacity in the cloud. The virtual machine service may allow users to obtain and configure compute capacity with minimal friction. As may be understood, the virtual machine service allows users to obtain resources for only the capacity that is actually needed. In some embodiments, the virtual machine service provides users tools to build failure resilient applications and isolate them from common failure scenarios. Moreover, in some embodiments, the virtual machine service may offer an execution container functionality to provide highly scalable, fast, container management on the virtual machine clusters to allow users to easily run and stop tasks on the virtual machines. The execution contains may provide simple API calls to allow users to launch and start user-defined tasks and obtain the current state of the virtual machines. As may be understood, in some embodiments, the virtual machine service may provide users a consistent deployment and build experience to create, manage, and scale sophisticated application on a microservices model. In some embodiments, the role manager 130 may also be used to create and manage roles for code seen in the virtual machine service 275.

As shown, another type of resource that may be recognized by the role manager 130 is a machine learning service 276. In some embodiments, the machine learning service may implement a managed for performing machine learning tasks to develop and build machine learning applications. In some embodiments, these tasks may include labeling and preparing machine learning data, choosing a machine learning algorithm, training a machine learning model, tuning and optimizing the model for deployment, execution the model to make predictions or take actions. In some embodiments, the role manager 130 may also be used to create and manage roles for code used in the machine learning service 276.

As shown, another type of resource that may be recognized by the role manager 130 is a database service 277. In some embodiments, the database service may implement a database that is hosted on resources managed by the service provider network. Depending on the embodiment, the database service may provide users the ability to query and update data according to a database API or database language (e.g., structure query language or SQL), and automatically scale resources for the database based on customer needs or operating conditions. In some embodiments, the database service may implement additional database features such as built-in security, backup and restore, data import and export, in-memory caching, data mirroring, query optimization, snapshotting, transactions, storage space management, and others. In some embodiments, the role manager 130 may also be used to create and manage roles for code used in the database service 277.

As shown, another type of resource that may be recognized by the role manager 130 is a data storage service 278. In some embodiments, the data storage service may implement a storage repository for arbitrary data objects and provide easy-to-use management features for the repository to allow users to organize their data and configure finely-tuned storage controls. In some embodiments, the data storage service may provide a set of managed features to implement scalability, data availability, data durability, security, and performance for their repositories. In some embodiments, the role manager 130 may also be used to create and manage roles for code used in the data storage service 278.

As shown, another type of resource that may be recognized by the role manager 130 is an extract, load, and transform (ETL) service 279. In some embodiments, the ETL service may implement a suite of tools to allow users to easily prepare and load their data for database storage or analytics. The ETL service may allow users to create ETL workflows with sequences of ETL jobs to seamlessly move data across different types of repositories. In some embodiments, the ETL service may be capable of automatically discovering the schemas for particular types of data repositories to allow users to easily design and configure ETL processes. In some embodiments, the role manager 130 may also be used to create and manage roles for code used in the ETL service 279.

As shown, another type of resource that may be recognized by the role manager 130 is a resource monitoring service 280. In some embodiments, the resource monitoring service may be configured to collect operational data from other resources and services in the service provider network in the form of logs, metrics, and events, and provide users with a unified view of the operational health of these resources and services and applications that run on top of the resources and services. In some embodiments, the resource monitoring service may be configured to monitor resources outside of the service provider network, such as an on-premises network at a client's location. In some embodiments, the role manager 130 may also be used to create and manage roles for code used in the resource monitoring service 280.

Figure 3:
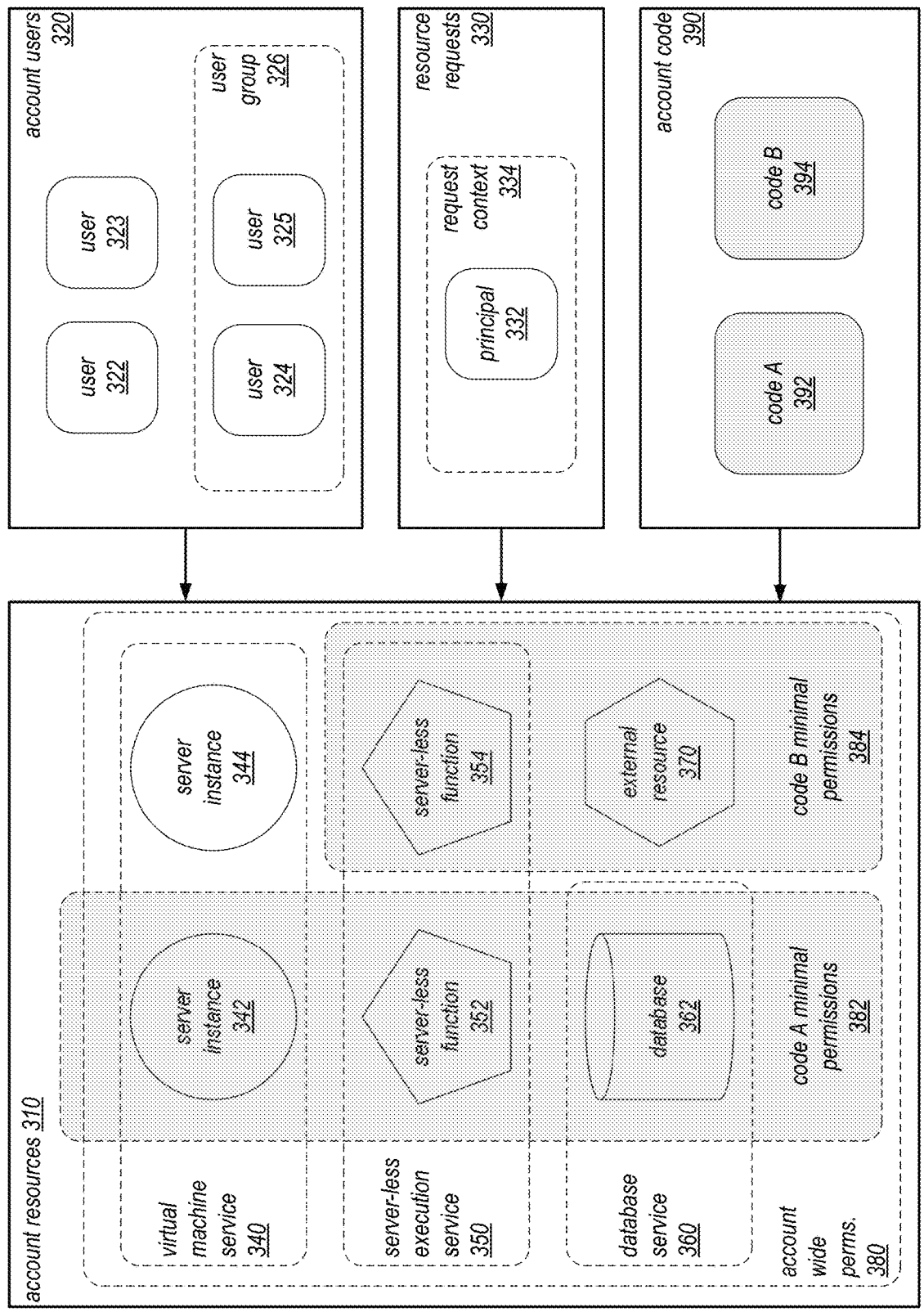
FIG. 3 illustrates example of minimal permission sets that are determined from analyzing different code segments in an account, according to some embodiments.

FIG. 3 illustrates example of minimal permission sets that are determined from analyzing different code segments in an account, according to some embodiments.

The figure depicts elements of an account. In some embodiments, a multi-user account may be created to for access a computing system. For example, in the service provider network 230 described in connection with FIG. 2, an account may be created for a group of users (e.g., all users within a single company or department). In some embodiments, individual users may also be created and individually authenticated. However, certain data about these users may be tracked on a per-account basis, for example, certain data about resource usage, resource permissions, or usage billings. As shown, in the figure, a number of users 322, 323, 324, and 325 are configured with access to an account 320. In some embodiments, user identities created under one account may be granted access to another account. In some embodiments, the users may be grouped in into user groups 326, which may be associated with group-level data, such as group-level resource permissions, etc. In some embodiments, an account may include many different user groups, which may be individually granted permissions via roles.

In some embodiments, resource access may be restricted based on individual requests 330. In some embodiments, an access request to a resource may be granted based on a request context 334 associated with the request. The request context 334 may indicate various information about a given request, such as the actions or operations indicated by the request, the resources indicated by the request, certain environment data associated with the request (e.g. the incoming IP address of the request, the time of day, etc.), and a principal 332. In some embodiments, the principal 332 may be associated with user identities, user groups, or roles. In some embodiments, authorization for the request may be dictated by access policies specified in terms of request contexts. In some embodiments, such access policies be resource-based (e.g., specified for particular resources), as opposed to identity-based (e.g., specified for individual user identities). It is noted that in the context of this disclosure, a "role" may be used to specify either either an identity-based access policy or a resource-based access policy. For example, in some embodiments, a code segment (e.g. code 120) may be analyzed to configure one or more access policy for one or more resource "roles."

As shown, the account may also be associated with a number of account resources 310. These resources may be created specifically for the account, for example, individual instances of computing resources hosted in a service provider network (e.g., service provider network 230). In some embodiment, some of the resources 310 may be resources that are not dedicated to the account, such as for example a resource that is shared by multiple accounts. As shown, a number of resources are shown in the figure. In this example, the account has access to two server instances 342 and 344 hosted via a virtual machine service 340, which may be the virtual machine service 275 of FIG. 2. As shown, the account also has access to two server-less functions 352 and 354 hosted in a server-less execution service 350, which may be the server-less execution service 271 of FIG. 2. As shown, the account also has access to a database instance 362 hosted by a database service 360, which may be the database service 277 of FIG. 2. As shown, the account also has access to an external resource 370. The external resource 370 may be an external system that is not part of the service provider network 230. In some embodiments, the external resource 370 may be a third-party service or resource. In some embodiments, the external resource 370 may be part of a client's own on-premises system, which is not hosted in a cloud-based service provider network. In some embodiments, the external resource 370 may have its own permission enforcement system, which may be distinct from the IAM system of the service provider network.

As may be appreciated, because many users have access to this account, it is important to restrict the activities of these users to a narrow set of resources permissions. This is particularly important in situations where user accesses to the account is not tightly controlled (e.g., where an account includes loosely control user groups. In such situations, it is important that individual account users do not receive all permissions in the account (e.g., via an account-wide role with account-wide permissions 380) for all resources 310 in the account. Such broad grants of account permissions results in significant security risks for the account. However, in some embodiments, complex code segments such as (e.g. code A 392 and code B 394) may access many different types of resources, making the proper specification of permission scope for these codes an extremely difficult and tedious task. Thus, users often simply grant broad account wide permissions 380 to such codes. As discussed, such practice essentially allows these code segments to have full permissions over all resources in the entire account, including permissions to access resources that was never intended to be accessed by the code.

Accordingly, in some embodiments, the role manager (e.g. role manager 130) automatically generates appropriate permissions for these code segments, so that users do not have to specify these permissions for the code. The generated roles and code permissions may be narrowly tailored for the code. As shown, in some embodiments, the role may be granted only a minimal set of permissions needed for the code. For example, the role for code A may be granted only the minimal set of permissions 382 needed for code A, and the role for code B may be granted only the minimal set of permissions 384 needed for code B. Accordingly, the role manager promotes the proper use of the permissions for these resources. In some embodiments, the minimal permissions 382 and 384 may only grant access permissions for resources seen or access in the associated code. For example, if code A 392 does not access the external resource 370, no permissions will be granted to the role for code A. In some embodiments, the minimal permissions may only include particular access operations that are performed in the code. For example, if code A only reads from database 362, no write permission will be granted to the role for code A. In some embodiments, a set of permissions that is broader than the minimal set may be permitted based on user policy or configurations, for example, where a particular role is shared by multiple code segments.

Figure 4A:
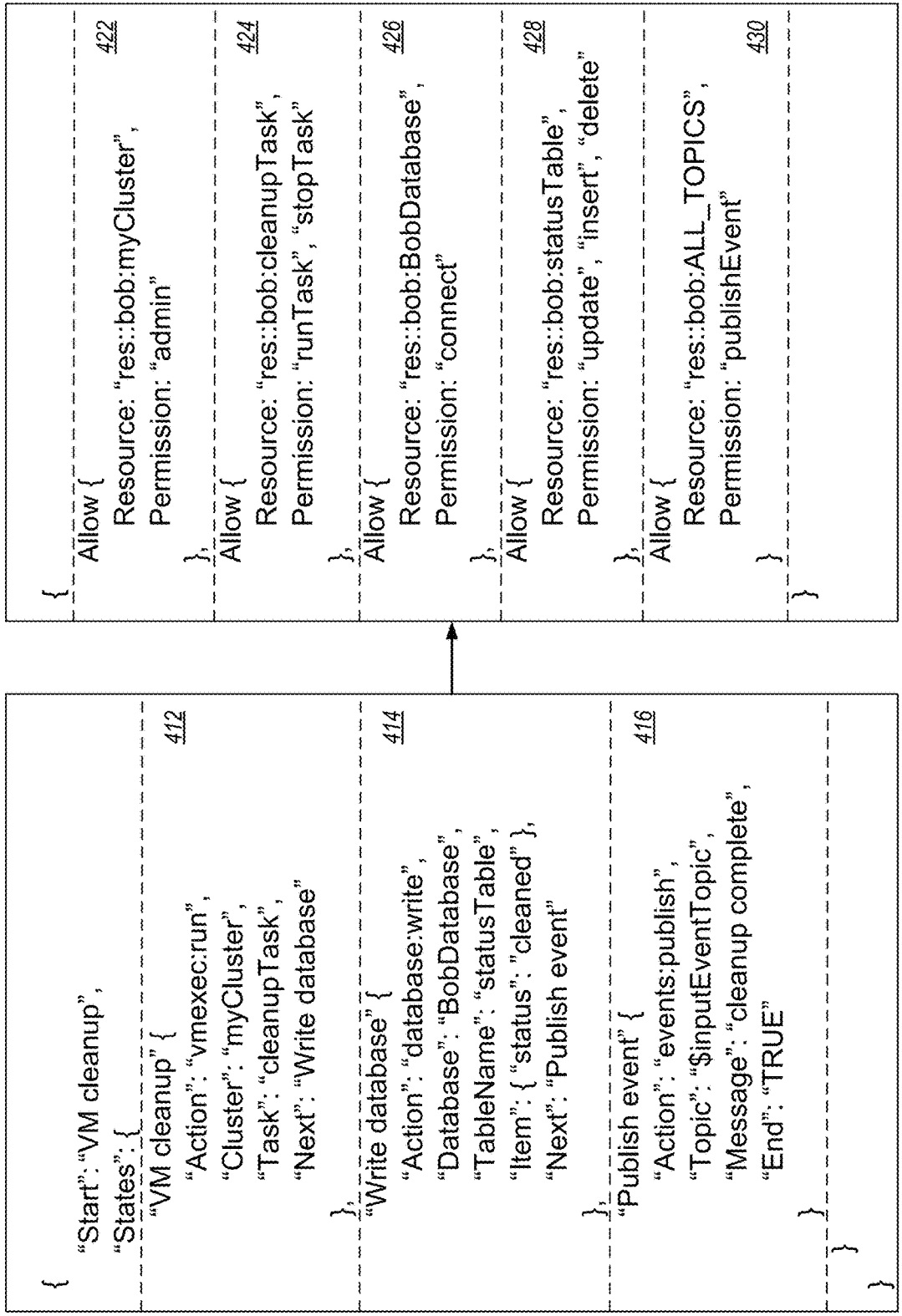
FIG. 4A depicts an example access policy that is generated by the role manager for executing a code that accesses resources, according to some embodiments.

FIG. 4A depicts an example access policy that is generated by the role manager for executing a code that accesses resources, according to some embodiments. As shown, the role 420 on the right may be generated for the code 410 on the right, which grants the code the needed permissions to access resources. In some embodiments, the role 420 may be generated by, for example, the resource manager 130 of FIG. 1.

As shown, the code 410 in this example includes a number of executable steps, which are specified as "states." As discussed, in some embodiments, a workflow system (such as workflow orchestration service 240) may define workflows as state machines, which define a workflow as states or state transitions. In this example, the code specifies three states 412, 414, and 416, and state transitions via the "Next" attribute in each state.

As shown, in state or step 412, a "VM cleanup" task is specified. As shown, the step 412 involves running a specified task "cleanupTask" on a cluster of computers (e.g. virtual machines) called "myCluster." The specified task may be executed using a virtual machine service (e.g., service 275 of FIG. 2). As shown, in state or step 414, a "Write database" task is specified. As shown, step 414 involves writing a table "statusTable" in a database "BobDatabase." The database and the table may be hosted by a databases service (e.g., service 277 of FIG. 2). As shown, in state or step 416, a "Publish event" task is specified. As shown, step 416 involves publishing an event (here just a textual message) to an event topic. The event topic may be maintained by an event publishing or message notification service (e.g. service 274 of FIG. 2), which broadcasts received events to registered listeners or subscribers. As shown, in this task, the event topic is not statically specified in the code. Rather, it is to be determined at runtime, based on an input variable.

As shown, the code 410 is analyzed to generate the role 420 on the right. In this example, five separate permissions 422, 424, 426, 428, and 430 are granted for the code 410 in the role 420. As discussed, in some embodiments, the role manager may scan the code for each resource instance accessed, and generate the permissioned needed for each resource.

As shown, permission 422 grants an "admin" permission to the resource "myCluster." In this example, the resource identifier "myCluster" in the code is modified by the role manager during the permission generation process, so that the identifier is transformed into a different format. In this example, the identifier "myCluster" is fully qualified with an account identifier "bob." In some embodiments, generated resource identifier may be a unique identifier any resource in the IAM system or a service provider network. In this example, the "admin" privilege may allow the code's executor to connect to nodes in the cluster as an administrator.

As shown, permission 424 grants the "runTask" and "stopTask" permissions to the resource "res::bob:cleanupTask." These permissions may be added to the access policy because the code 410 included an instruction 412 to execute the task "cleanupTask," and that the execution may require specific permissions on the executable task. The role manager in this example may be configured with the necessary rules or logic to recognize this type of resource access, generate the permissions 424 accordingly.

As shown, permissions 426 and 428 grant permissions to connect to the database "res::bob:BobDatabase" and to perform update, insert, and delete operations on the table "res::bob:statusTable." In this example, the table "statusTable" may be a table in the database instance "BobDatabase." Permissions 426 and 428 may be generated because instruction 414 in the code 410 indicates a write to the status table. The role manager may recognize that this instruction requires the permission to connect to the database and certain permissions on the target table, and thus generate these permissions 426 and 428 accordingly.

As shown, permission 430 grants a permission to publish an event to a set of event topics. In this example, the identifier "res::bob:ALL_TOPICS" may be used to indicate all topics that are available in the account for "bob." In some embodiments, the access policy language or specifications may provide such identifiers as a shorthand for granting permissions to groups of resources. In this example, the grant to all event topics may be generated because the "Publish event" instruction 416 in the code refers to a dynamic resource "$inputEventTopic," which is not fully resolved or determined in the code 410. The dynamic resource may be resolved or determined at the runtime. In some embodiments, the role manager may recognize this dynamic resource, and generate a permission 430 that is broad enough to encompass all possible resource instances (e.g. all event topics) that may be required that the instruction. In this example, the permission 430 allows the code to have publish access to all events under the "bob" account. This may be chosen because the code 410 is owned by and only executable by the "bob" account. In some embodiments, the scope of the permission 430 may be controlled by different rules or conditions. In some embodiments, generation of permissions for dynamic resources may be manually configurable by the user, for example, during an authoring session of the code.

Figure 4B:
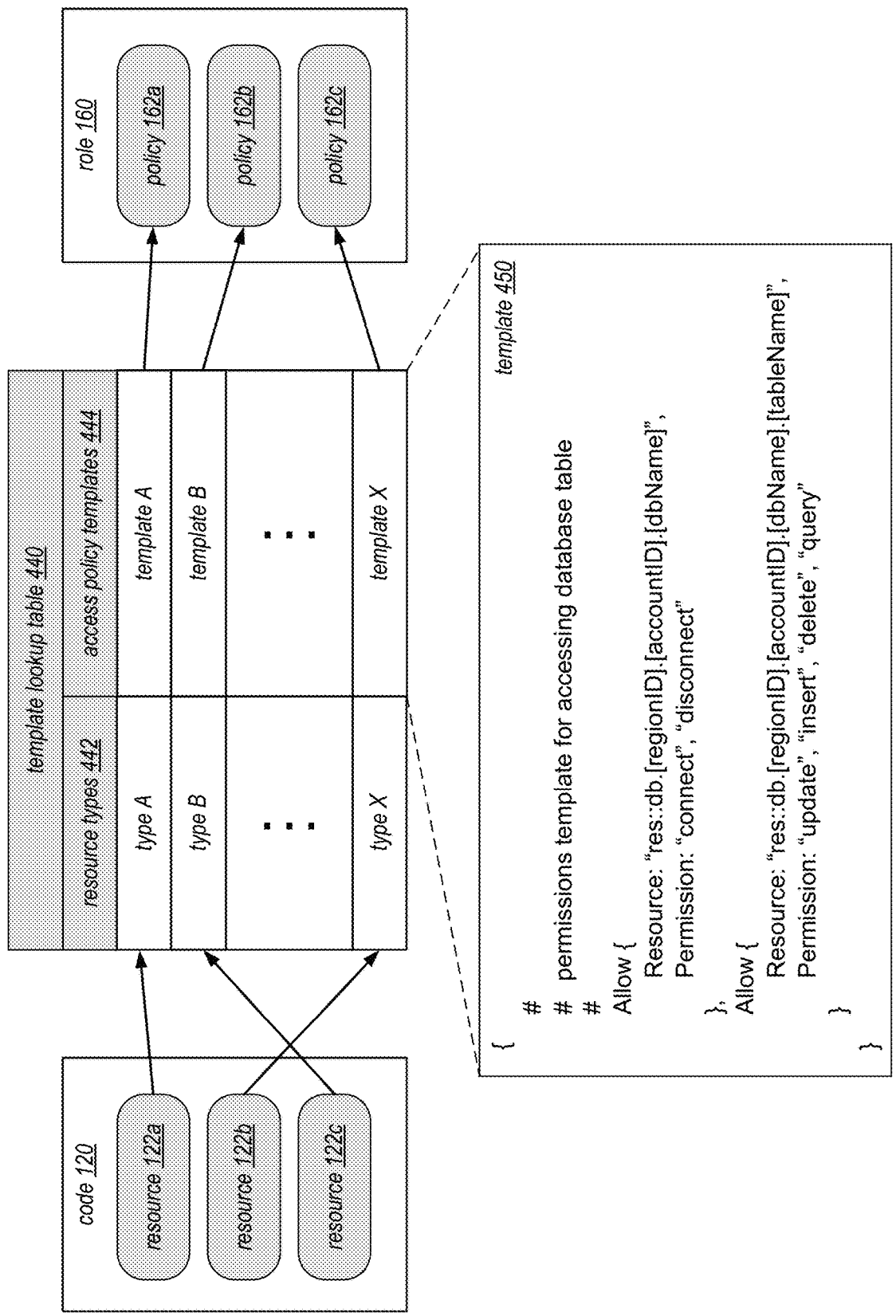
FIG. 4B depicts a policy template used by the role manager for generating roles for executing code, according to some embodiments.

FIG. 4B depicts a policy template used by the role manager for generating roles for executing code, according to some embodiments. As shown, in some embodiments, the role manager (e.g. role manager 130) may employ a template lookup table 440 to generate the roles for code segments. In some embodiments, the template lookup table 440 may be stored as part of the access policy templates repository 136, as discussed in connection with FIG. 1.

In some embodiments, as shown, the templates lookup table 440 may implement a lookup table that maps resource types 442 seen in the code segment 120 to access policy templates 444. In some embodiments, the table or mapping may be implemented within code or as a rule. For example, in some embodiments, the role generation process may be implemented via a textual transformation of the code segment 120 to the role 160, which may also be represented in textual data (e.g., from one file to another file). In some embodiments, the transformation may be performed via a transformation tool such as an Extensible Stylesheet Language Transformations (XSLT) or some other form of transformation tool. In some embodiments, the templates lookup table 410 may be user configurable. In this manner, the role generation behavior of the role manager is not embedded in code, and may be configurable to include different types of code segments, resource types, and access policies.

As shown, in some embodiments, the lookup table 440 may map different resource types to different access policy templates. For example, an access to a message queue may correspond to an access policy that enumerates the types of permissions implemented by that resource type (e.g., adding messages to a queue, retrieving messages from a queue, etc.) In some embodiments, one resource type may be mapped to multiple access policy templates. In some embodiments, multiple resource types may be mapped to a single access policy template.

As shown, one example access policy template 450 is shown on the bottom. As discussed, in some embodiments, the templates may be specified in code or in rules. In some embodiments, these templates may be user configurable, so that the syntax of the generated permission policies may be easily configured to suit the requirements of the IAM system. In this example, the template 450 is used for accessing a database table. As shown, the template 450 indicates what permissions are needed for accessing a database table. In some embodiments, the role manager may be aware of the different permission models for many different types of resources, and be able to generate access policies for the different types of resources. For example, in some embodiments, a different policy template may exist for each resource type, and templates may be added for each new resource type to augment the policy generation capabilities of the role manager.

In some embodiments, the contents of the policy may vary based on the type of access observed in the code 120, and such variance may be controlled via rules, which may be specified as conditional statements in the template 450. In this example, when a database table access is seen in the code 120, the template 450 indicates that a first permission to connect to and disconnect from a database should be granted, and a second permission to update, insert, delete, and query the subject table should be granted. As shown, in this example, the template 450 may specify the format to construct a resource identifier in the IAM permission policy language. For example, here, a database resource identifier may be transformed include the "regionID," "accountID," and "dbName" associated with the database, which may be values received at the time of generation and used to populate the template to generate actual policies 162 in the role 160.

Figure 5A:
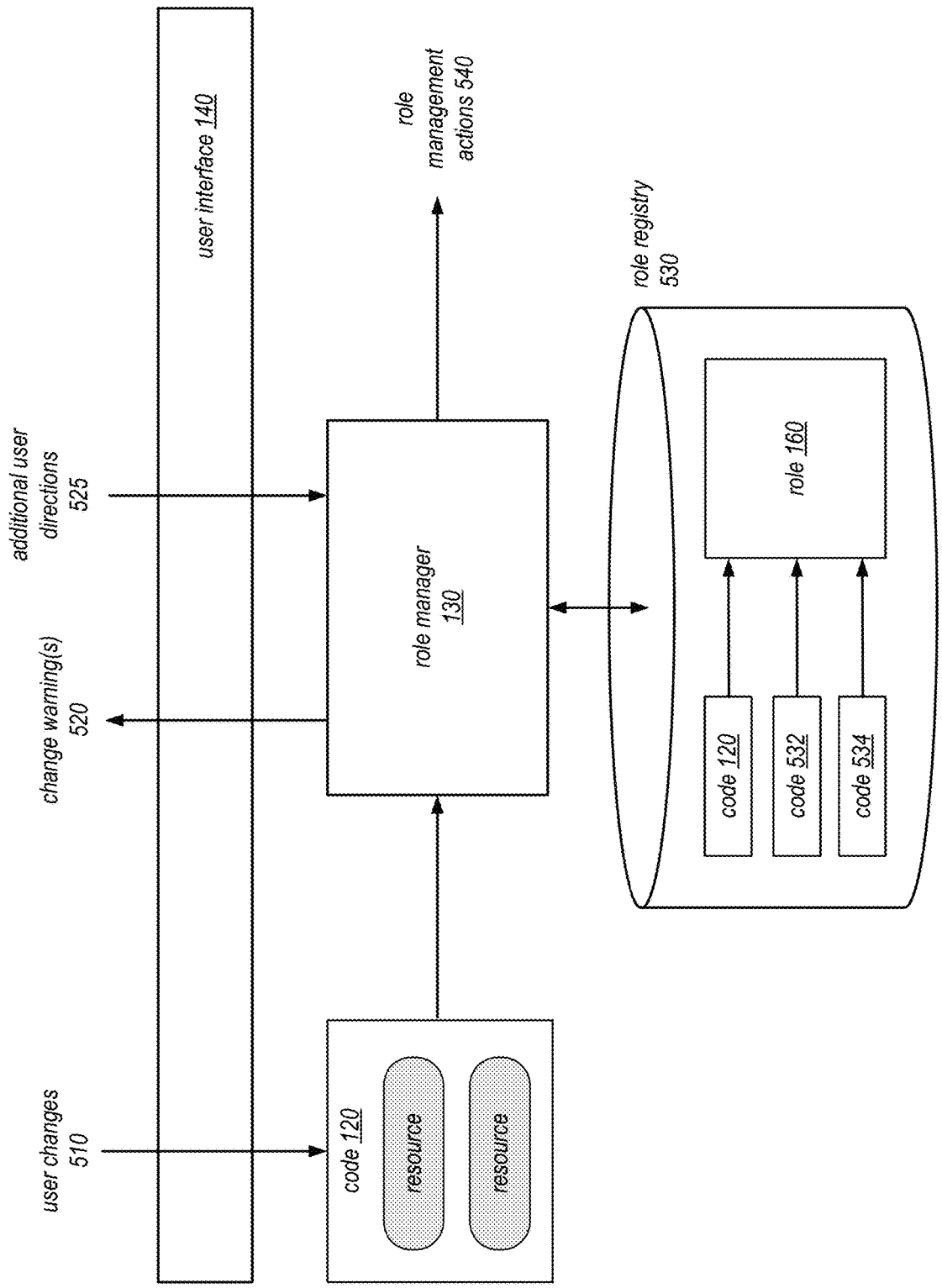
FIG. 5A illustrates a role registry used by the role manager to manage changes to the code and associated roles, according to some embodiments.

FIG. 5A illustrates a role registry used by the role manager to manage changes to the code and associated roles, according to some embodiments. As shown, in some embodiments, the role manager 130 may employ a role registry 530, which may maintain metadata about which code segments are associated with which roles. In some embodiments, the role registry 530 may be implemented as a separate repository from the role manager 130. In some embodiments, the role registry 530 may be implemented as a part of the role manager 130. Similarly, the user interface 140 may be implemented as a part of or separate from the role manager 130, depending on the embodiment.

With the role registry 530, the role manager 130 may implement a managed service that automatically updates roles as their associated code segments change. In some embodiments, the role manager 130 may simply provide notifications or warnings to the user about needed role management actions 540 in response to code changes. In some embodiments, the role manager 130 may implement a fully managed solution, to automatically update roles or perform other role management actions 540. In some embodiments, the user may not need to (or even be prohibited from) making direct changes to the roles, and all role updates are performed by the role manager 130, either automatically or with user approval.

As shown, in this example, user changes 510 are made to the code 120. For example, the user interface 140 may be the user interface of a code authoring system or environment. In some embodiments, as the code 120 is being edited or changed, or when the code edits are being saved, the role manager 130 may check the execution role associated with the code (here role 160), to determine if the code changes will require the associated role 160 to be updated, or whether any other role management actions 540 are needed. As shown, in this example, the association between the role 160 and the code 120 are stored in the role registry 530. In this example, the role 160 is a shared role that is assigned to multiple code segments 120, 532, and 534. Thus, the role 160 must provide sufficient permissions to all three of these code segments. In some embodiments, a single code segment may be associated with multiple managed roles. In some embodiment, when the role manager determines that a role is no longer used by any code segments, the role manager may automatically (or with user approval) delete the role.

As shown, as a result of the user changes 510, the role manager 130 may generate one or more warnings 520. The warnings 520 may be generated based on a re-analyzing of the code 120 after the changes 510. In some embodiments, the warning may indicate that the associated role 160 is no longer sufficient for all resource accesses in the code 120, and indicate one or more additional permissions to be added to the role. In some embodiments, the warning may indicate that the role 160 now grant excessive numbers of permissions for the code 120. In some embodiments, these warnings may be generated based on other code segments that are associated with the role. For example, in some embodiments, a warning may indicate that although the permissions of the role can be reduced as a result of changes to code 120, such a reduction in permissions may cause the role 160 to be in sufficient for other codes 532 or 534. In some embodiments, the role manager 130 may recommend that a new role be generated for some code segment, or that an existing role in the system be used for some code segment instead of role 160.

In some embodiments, changes to the role 160 as a result of changes 510 to the code 120 may cause permission problems for the other codes 532 and 534, but the role manager 130 may not immediately remedy these problems. Rather, the role manager 130 may simply log or track these problems, and warn the user that codes 532 and 534 may no longer be associated with an adequate execution role as a result of the changes. Such a warning may be provided to the user via a code management view of the user interface 140, or when the user next executes or edits code segments 532 or 534.

As shown, in some embodiments, the role manager 130 may receive additional user directions 525 from the user via the user interface 140. For example, in some embodiments, warnings 520 may include recommendations for role management actions 540 and ask for user approval before taking these actions. In some embodiments, the additional user directions 525 may specify one of a number of recommended role management actions to take (e.g., modify the role, generate a new role, assign a different role, etc.). The role manager 130 may then perform the role management actions according to the user feedback. In some embodiments, the role manager 130 may not seek user feedback, but simply perform the role management actions 540 automatically. In some embodiments, these actions may be specified via configurable policies maintained by the role manager 130. Such policies may be customized for different users, code segments, or projects, etc.

Figure 5B:
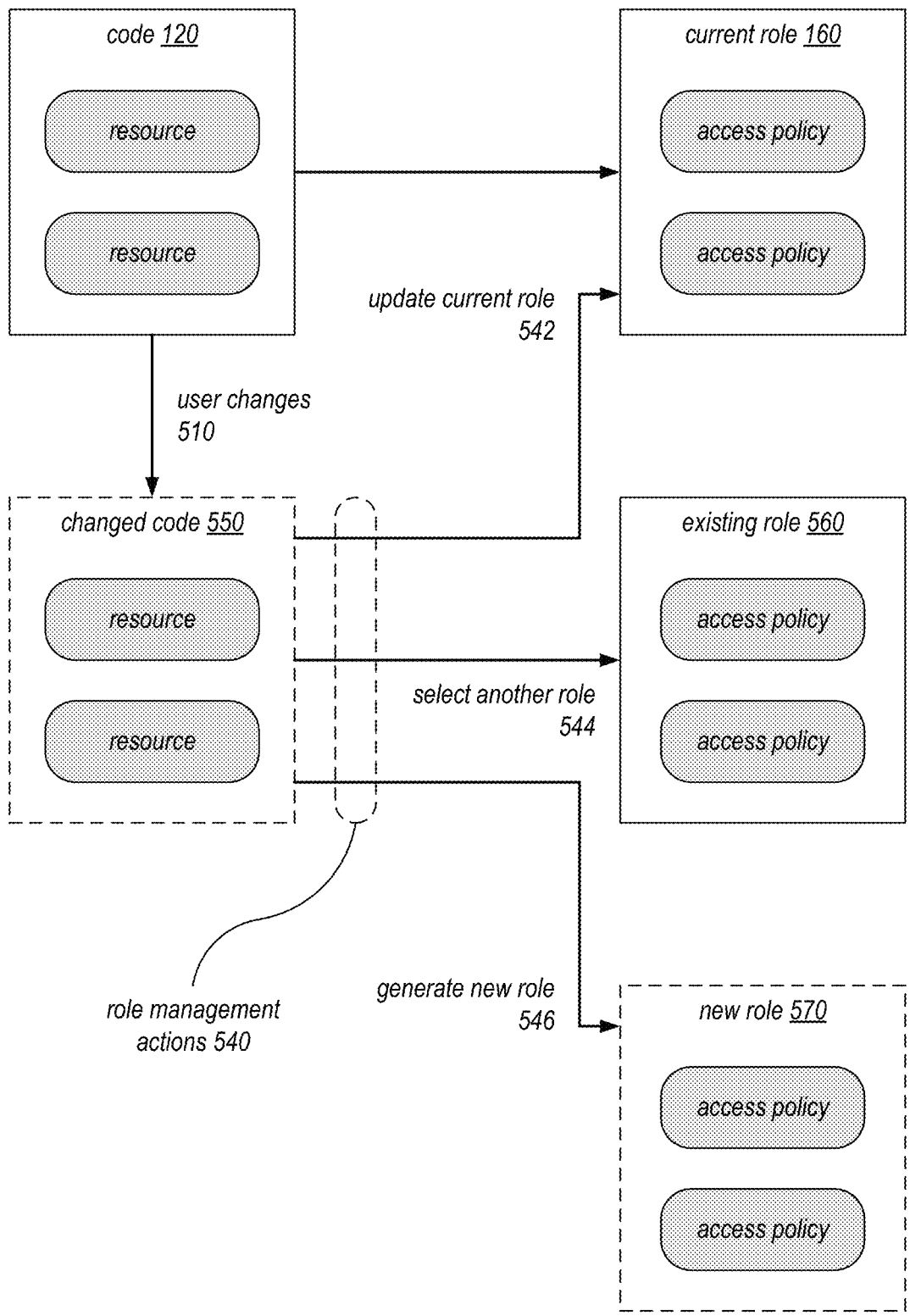
FIG. 5B illustrates different role management actions that may be performed by the role manager to as a result of changes made to a code, according to some embodiments.

FIG. 5B illustrates different role management actions that may be performed by the role manager to as a result of changes made to a code, according to some embodiments. As shown, the figure depicts a number of different role management actions 542, 544, and 546 that may be performed, depending on the embodiment or the configuration of the role manager.

As shown, initially, a code segment 120 is associated with a current role 160. When the code 120 is changed via user changes 510, a changed version of the code 550 is produced. In some embodiments, this change 510 may cause the role manager 130 to perform a number of different role management actions 540, as discussed in connection with FIG. 5A. As discussed, the actions 540 may be performed as manual user actions or automated system actions, depending on the embodiment. In some embodiments, one or more of these actions may be recommended by the role manager 130, and the user may select or approve one or more of these actions. In some embodiments, factors governing the selection of actions 542, 544, and 546 may be specified in a configurable policy of the role manager. In some embodiments, the role management actions 540 may be performed before the changed code 550 is saved or finalized. In some embodiments, the role management actions 540 may be performed after the changed code 550 is saved.

As shown, one role management action that may be performed as a result of a code change is an update of the current role 542. For example, in some embodiments, the role manager may modify role 160 in the IAM system to change the permissions granted to the role. In some embodiments, action 542 may be selected or recommended by the system where the role 160 is not associated with any other code segments in the system, or when the system limits the number of roles that can be created.

As shown, another example role management action that may be performed as a result of a code change is the selection of another existing role 544. For example, in some embodiments, the role manager may analyze the changed code 550, and scan existing roles in the system (e.g. roles available to the user account) that has sufficient permissions to execute the code 550. In this example, existing role 560 is selected. In some embodiments, action 544 may be preferred to action 542 where the number of roles in the system is limited. In some embodiments, the role manager may select a role that has the narrowest permissions to permit execution of the code 550. In some embodiments, the role manager may prefer to select an existing role that is associated with fewer number of code segments.

As shown, another example role management action that may be performed as a result of a code change is the generation of a new role 546. In this example, new role 570 is created to execute the changed code 550. In some embodiments, the role manager may employ this option where the number of roles in the system is unlimited, when it is impracticable to update the current role (e.g. because the current role is already used by many other code segments), or when no existing roles can be found to permit the resource accesses needed by the change code 550.

FIG. 6A to 6D depict example graphical user interfaces (GUIs) that implement user interfaces of a role manager, according to some embodiments. In some embodiments, the depicted GUIs or views may be implemented as part of the user interface 140, code authoring system 110, or the IAM system 150, as discussed in connection with FIG. 1. In some embodiments, these GUIs or views may be generated locally on a computer using natively constructed GUI widgets. In some embodiments, these GUIs or views may be web interfaces, which are generated at a remote web server and sent to a web browser to be displayed.

Figure 6A:
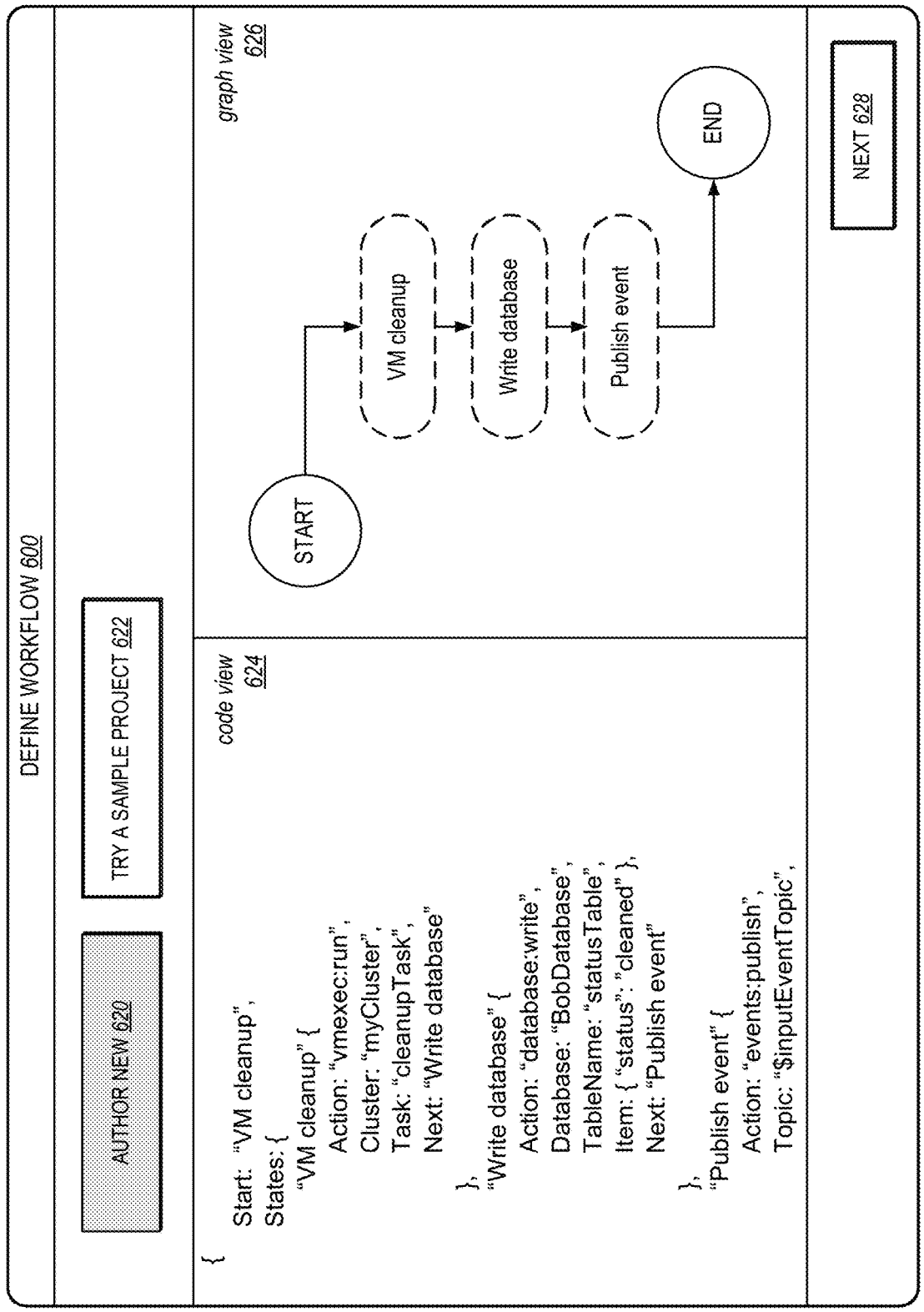

FIG. 6A depicts a GUI or view 600 to define a workflow. In some embodiments, this view may be provided in a code authoring environment. The code authoring environment may allow users to view and modify code segments in a domain-specific code language, such as a workflow specification language. In this example, an example code segment is shown in the code view 624. In some embodiments, the user may click the AUTHOR NEW button 620 to start creating a new code segment, or click the TRY A SAMPLE PROJECT button 622 to reuse existing code from a sample project. In some embodiments, as the user edits the code in the code view 624, the view 600 may update, either automatically or by user request, a graph view 626, which displays a flow chart of the states or steps in the workflow specified in the code. In some embodiments, the redrawing of the flow chart may involve parsing the code in the code view 624 and validating the code according to accepted code syntax. In some embodiments, the user may click the NEXT button 628 to proceed to a next step of the code creation process, where an execution role will be defined for the code.

Figure 6B:
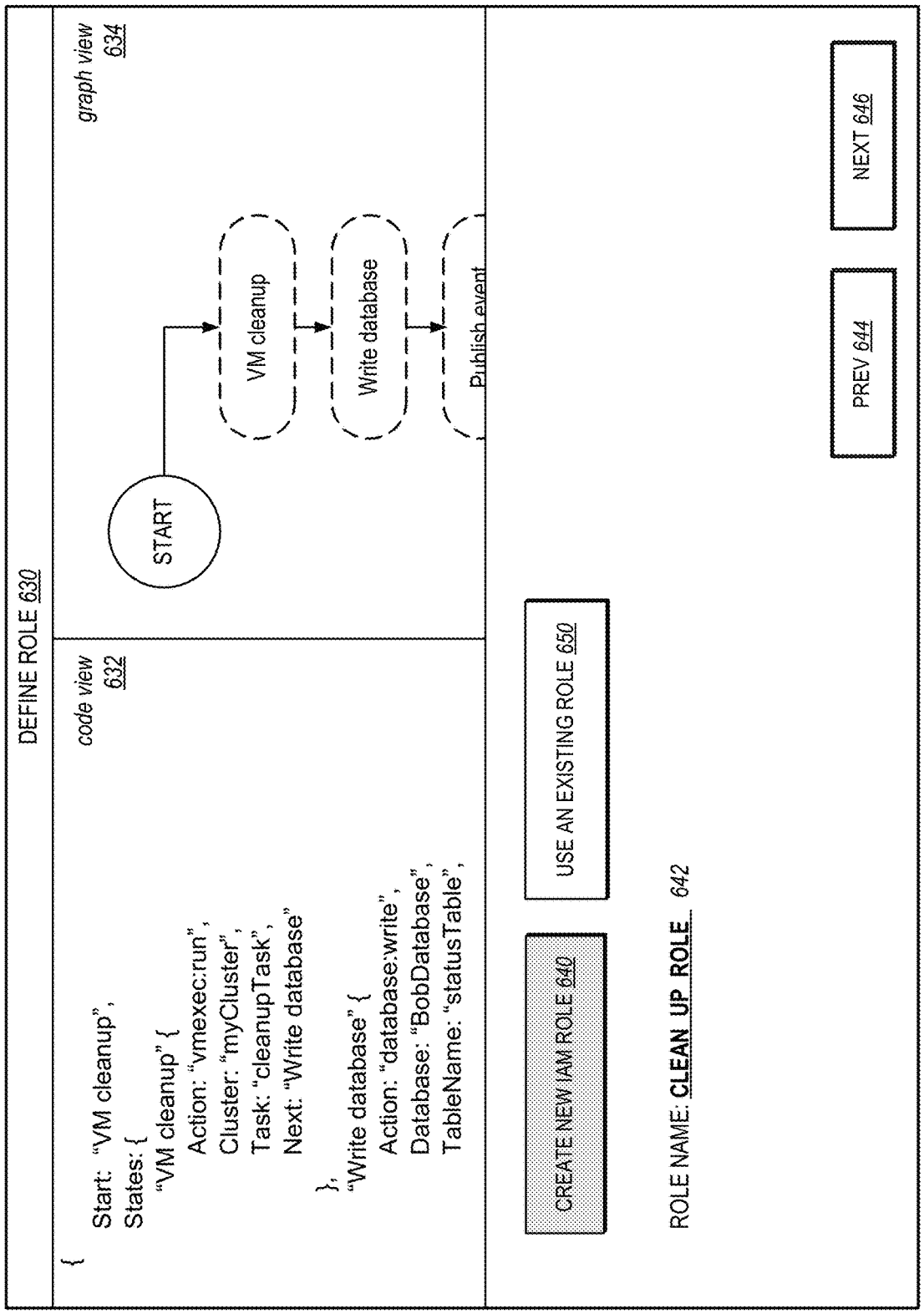

FIG. 6B depicts a GUI or view 630 to define a role for the code. In this example, the code view 632 and graph view 634 are still shown. In this example, the role definition may be performed in two ways. First, a new IAM role may be generated if the CREATE NEW IAM ROLE toggle button 640 is selected. Second, an existing role may be reused if the USE AN EXISTING ROLE toggle button 650 is selected. In this example, the CREATE NEW IAM ROLE toggle button is selected, and the GUI allows the user to specify a role name for the role, via text field 642.

Figure 6C:
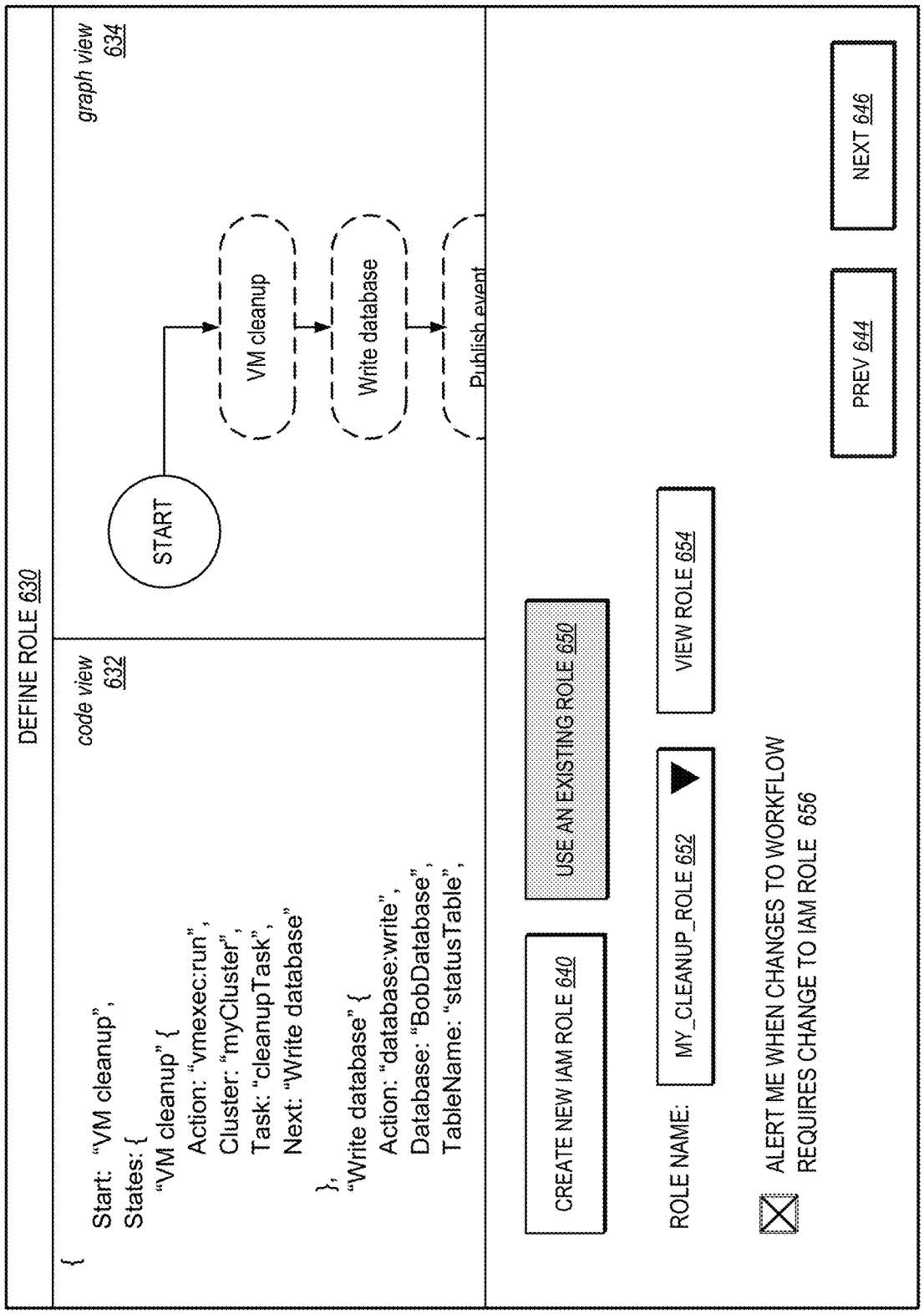

FIG. 6C depicts the GUI or view 630, where the USE AN EXISTING ROLE toggle button 650 is selected. In this example, when toggle button 650 is selected, a selection box 652 is displayed, which allows the user to select a role from a list of existing roles available to the user (e.g. a list of roles that were created under that user account). In some embodiments, the selection box 652 may only list existing roles that have the permissions needed to execute the code. In some embodiments, the selection box 652 may list the existing roles in a sorted order, for example, sorted according to the breadth of permissions granted to each role. As shown, the GUI 630 may also include a VIEW ROLE button 654, which allows the user to view the details of the selected role, for example, the access policies of the selected role. In this example, a checkbox 656 is also included, which allows a user to indicate a configuration to be notified if the changes to the workflow code requires changes to the role. For example, in some embodiments, the user may flip back and forth between the code definition view 600 and the role definition view 630. Not all changes to the code requires a change to the assigned role. However, if the checkbox 656 is checked, the GUI may re-analyze the code every time the user navigates to the define role view 630, and if any code changes requires additional resource permissions that are not granted to the role, a warning may be provided to inform the user of the problem. The PREV button 644 takes the user back to the code definition view 600, and the NEXT button 646 takes the user to a next step of the role definition process.

FIG. 6D depicts a preview role GUI or view 660, which may be displayed or generated when the NEXT button 646 is clicked. In this example, the code view 632 and graph view 634 are still shown. These views allow the user to view the code, flow chart, and the generated role permissions at the same time. At the bottom, a role description table 670 is provided. In this example, the role description table may list the different resources 672 that were recognized in the code, the respective policy templates 674 that were selected for these resources accessed, a textual description 676 of each template, and the ultimate access policy 678 that were generated from the templates. As shown, in some embodiments, the table 670 may include clickable links that allow users to view the templates or the generated policies. In some embodiments, the templates or the policies may be edited via these links. The PREV button 680 here may take the user back to a previous view, such as the role definition view 630. The SAVE button 682 may cause the role to be created or updated in the IAM system, with the specified access policies 678. As may be understood, the provided sequence of user interfaces allows a user to painlessly create or choose an execution role for a code segment as the code is being created or edited. The user is spared from having to manually create the role to specify the permissions needed for each resource, and manually update the role as the code changes. The process also ensures that the generated role permissions are correct and not overly broad, regardless of the complexity of the code.

Figure 7:
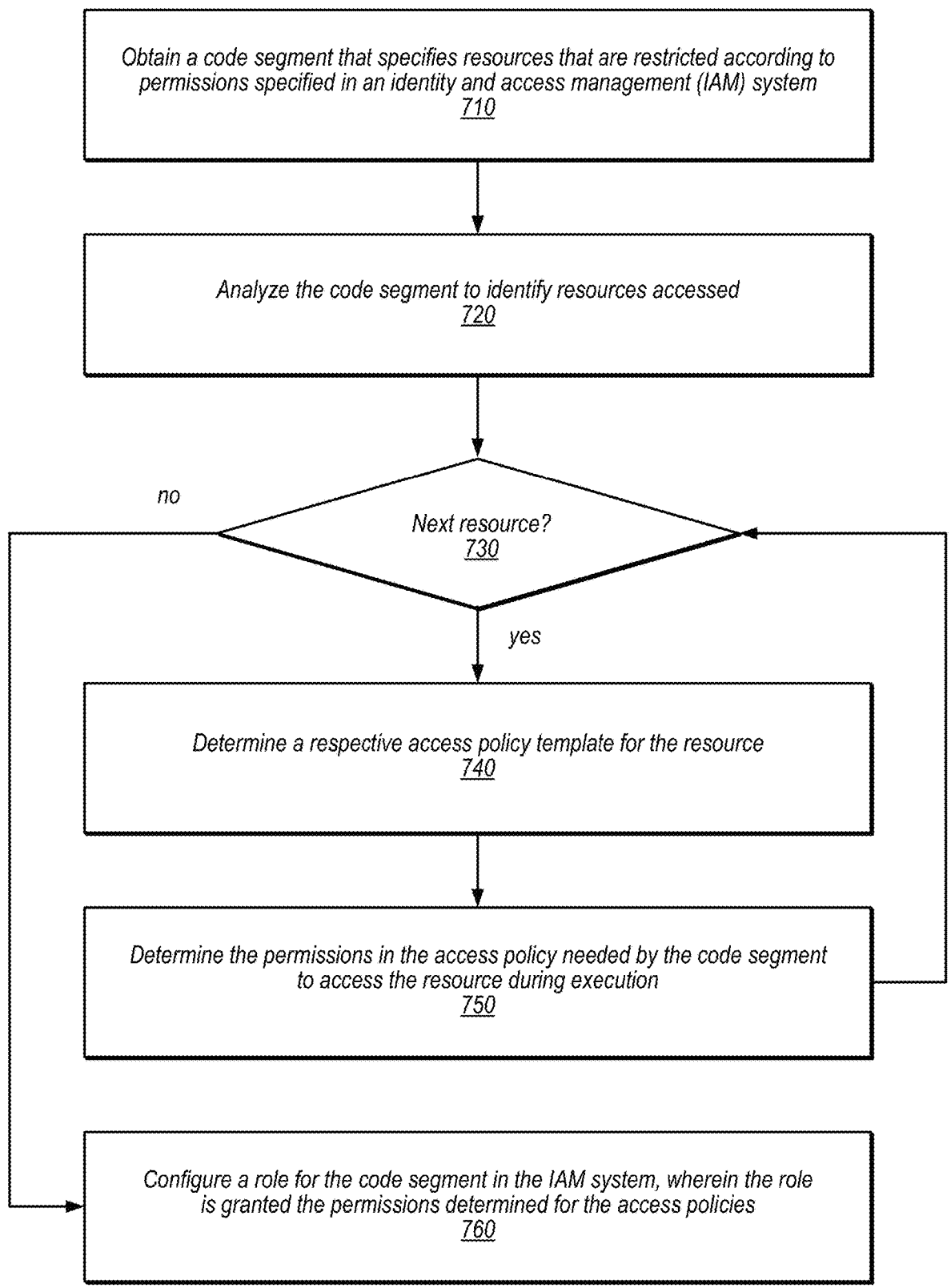
FIG. 7 is a flow diagram illustrating a process of generating a role with permissions for executing a code, according to some embodiments.

FIG. 7 is a flow diagram illustrating a process of generating a role with permissions for executing a code, according to some embodiments. In some embodiments, the process depicted in the figure may be performed by the role manager 130, as discussed in connection with FIG. 1.

The process begins at operation 710, where a code segment is obtained. The code segment may be, for example, code 120 of FIG. 1 or 310 of FIG. 4A. The code segment may specify resources that are restricted according to permissions specified in an IAM system, for example IAM system 150 of FIG. 1. In some embodiments, the code may be written in a domain-specific language which can be executed by or specify configurations for a particular system or service on a service provider network. In some embodiments, the code may specify an orchestration workflow that accesses the resources. In some embodiments, the code may specify resources to be provisioned by a resource provisioning service. In some embodiments, the code may be produced in a code authoring system or environment.

At operation 720, the code segment is analyzed to identify resources that are accessed. In some embodiments, the code may be parsed to determine a list of resource accessed. In some embodiments, the code may be scanned using an expression match to identify the resources. In some embodiments, an access to a dynamic resource in the code (e.g., a resource that is resolved or determined at the runtime) may cause a set of all possible resources that can resolve to the dynamic resource to be added to the list of resources. In some embodiments, a tool such as a text-to-text transformation or translation tool may be used to identify the resources accessed or simply to translate the code into an access policy for the role to enable the resource accesses.

At operation 730, in some embodiments, an iterative process begins to iterate through all of the identified resources. As shown, operations 740 and 750 are performed for each individual resource identified, until there are no more resources. At operation 740, an access policy template is determined for an individual resource. In some embodiments, an access policy template may be a configurable template that specifies an access policy for a particular type of resource. The access policy template may be obtained via a lookup table that is keyed on the different types of resources. In some embodiments, the access policy templates may include different values that are left open (e.g., a resource name), which may be filled in by the role manager for each particular instance of resource access seen in the code segment.

At operation 750, the permissions in the access policy that are needed by the code segment to access the resource are determined. In some embodiments, the role manager may simply grant all permissions available for the resource to the execution role. In some embodiments, the role manager may only grant a limited set of permissions. For example, when a resource is only accessed for a read request, only read permissions may be granted for the resource. As shown, the process then repeats for the next identified resource in the list, until permissions for all identified resources have been determined. The process then proceeds to operation 760.

At operation 760, a role is configured for the code segment in the IAM system. The role is configured so that it is granted all of the permissions determined for the access policies. In some embodiments, the role is granted a minimal set of permissions that are needed to access the resources during execution of the code segment. In some embodiments, the role may be generated or updated via the role creation and update module 138, as discussed in connection with FIG. 1. In some embodiments, the role manager 130 may create or update a role stored in an IAM system (e.g. IAM system 150), and grant the access permissions needed to execute the code to the role in the IAM system. In some embodiments, the generation or configuration of the role may be performed via one or more requests sent to the IAM system, for example via one or more API calls to the IAM system. In some embodiments, the role manager or IAM system may then associate the role with the code segment, for example, in a role registry 530. In this manner, subsequent updates to the code may trigger modifications to or notifications about the role, and vice versa.

Figure 8:
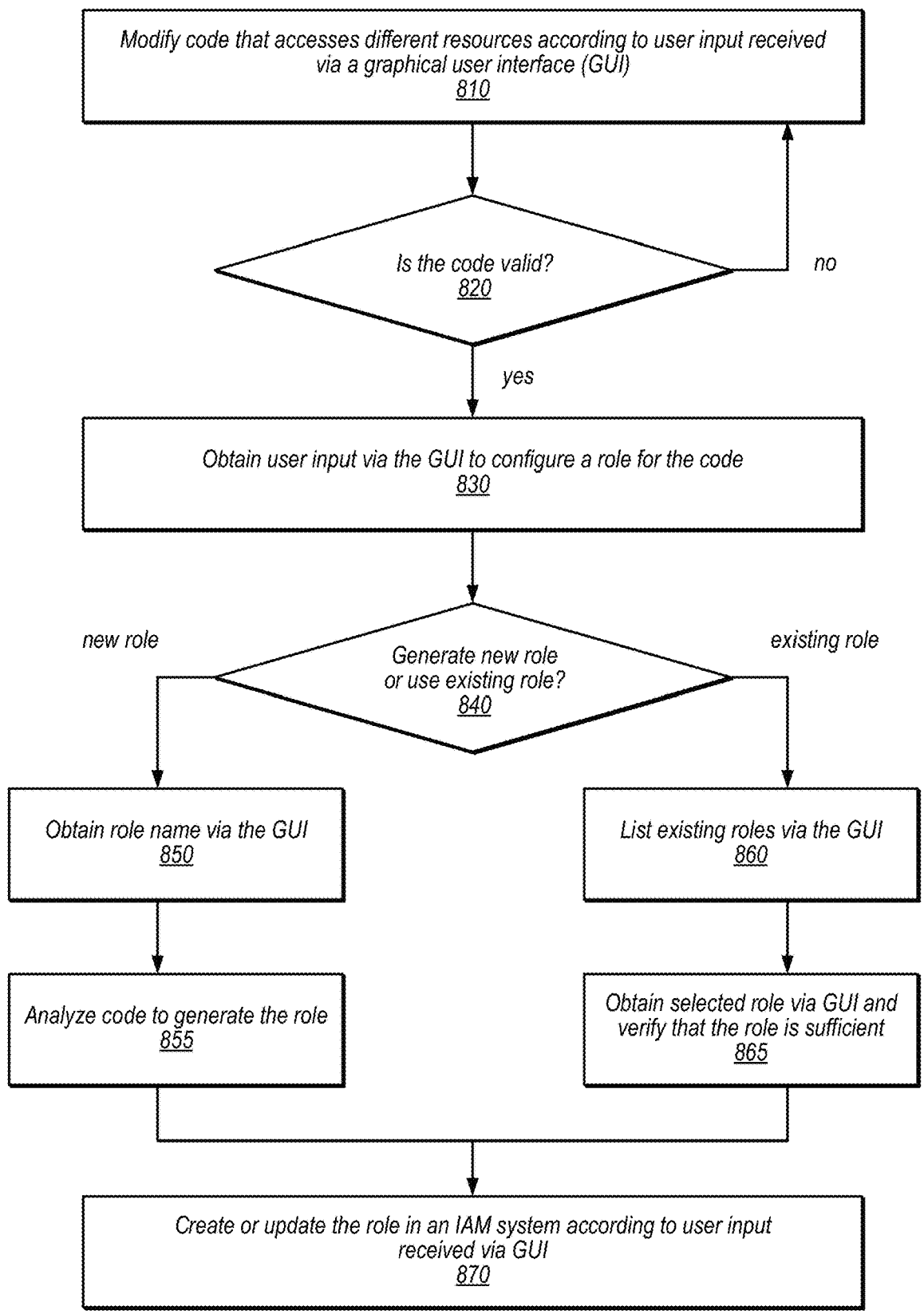
FIG. 8 is a flow diagram illustrating a process of using a GUI to create or update a role for a code that has been modified, according to some embodiments.

FIG. 8 is a flow diagram illustrating a process of using a GUI to create or update a role for a code that has been modified, according to some embodiments. In some embodiments, the process depicted in the figure may be performed by, for example, the user interface 140 of FIG. 1, or the user interfaces shown in FIGS. 6A to 6D.

As shown, at operation 810, a code is modified. The code may be the code segment 120 shown in FIG. 1, an may specify accesses of different resources. The code may be modified according to user input received a GUI. For example, in some embodiments, the code may be edited in a code authoring or development system or environment. In some embodiments, the code authoring system may include user interface elements or functionality that analyzes the code to generate or update a role (e.g. role 160 of FIG. 1) that grants resource permissions to the code.

At operation 820, a check is performed to determine if the code is valid. For example, in some embodiments, a syntactical check may be performed on the code before the code is saved or compiled. In some embodiments, the role generation or update process may be performed in response to a user command. For example, the role may be generated when the code is saved or compiled. If the code is not valid, the user may be notified via the GUI and use the GUI to make further modifications to the code. If the code is determined to be valid, the process proceeds to operation 830.

At operation 830, user input is obtained via the GUI to configure a role for the code. In some embodiments, the selection may be performed using user interface elements shown on the GUI 630 in FIG. 6B or 6C. For example, the GUI may include user interface elements to allow a user to select whether to create a new role for the code, or choose an existing role in the system to assign to the code. At operation 840, the user input is evaluated to determine whether the user selected to generate a new role or use an existing role for the code. If the user selected to generate a new role, the process proceeds to operation 850. If the user selected to use an existing role, the process proceeds to operation 860.

At operation 850, a role name is obtained via the GUI. For example, the role name may be specified for a new role to be generated via a text field, as shown in FIG. 6B. At operation 855, the code is analyzed to generate the new role. The process of analyzing and generating the role may be performed in similar fashion as described in connection with FIG. 7.

At operation 860, if the user elects to user an existing role for the code, a list of existing roles in the system are provided via the GUI. In some embodiments, the existing roles may be provided via a selection box, as shown in FIG. 6C. In some embodiments, only those existing roles that have sufficient resource permissions for the code are shown. At operation 865, a selected role from the list of existing roles is obtained via the GUI. In some embodiments, the code may be analyzed to verify that the selected role is sufficient for the code (e.g., has all the permissions needed by the code).

At operation 870, the role is created or updated in the IAM system according to user input received via the GUI. In some embodiments, the GUI may allow a user to interact directly via the IAM system, for example via an exposed API, to create or modify stored roles. In some embodiments, the GUI may allow the user to make additional adjustments to the role before it is created or updated. For example, in some embodiments, the GUI may allow a user to fine tune the permissions that are generated for the role. In some embodiments, the GUI may allow a user to adjust metadata about the role, for example, which code segments are registered to the role and change notification configurations associated with the role.

Figure 9:
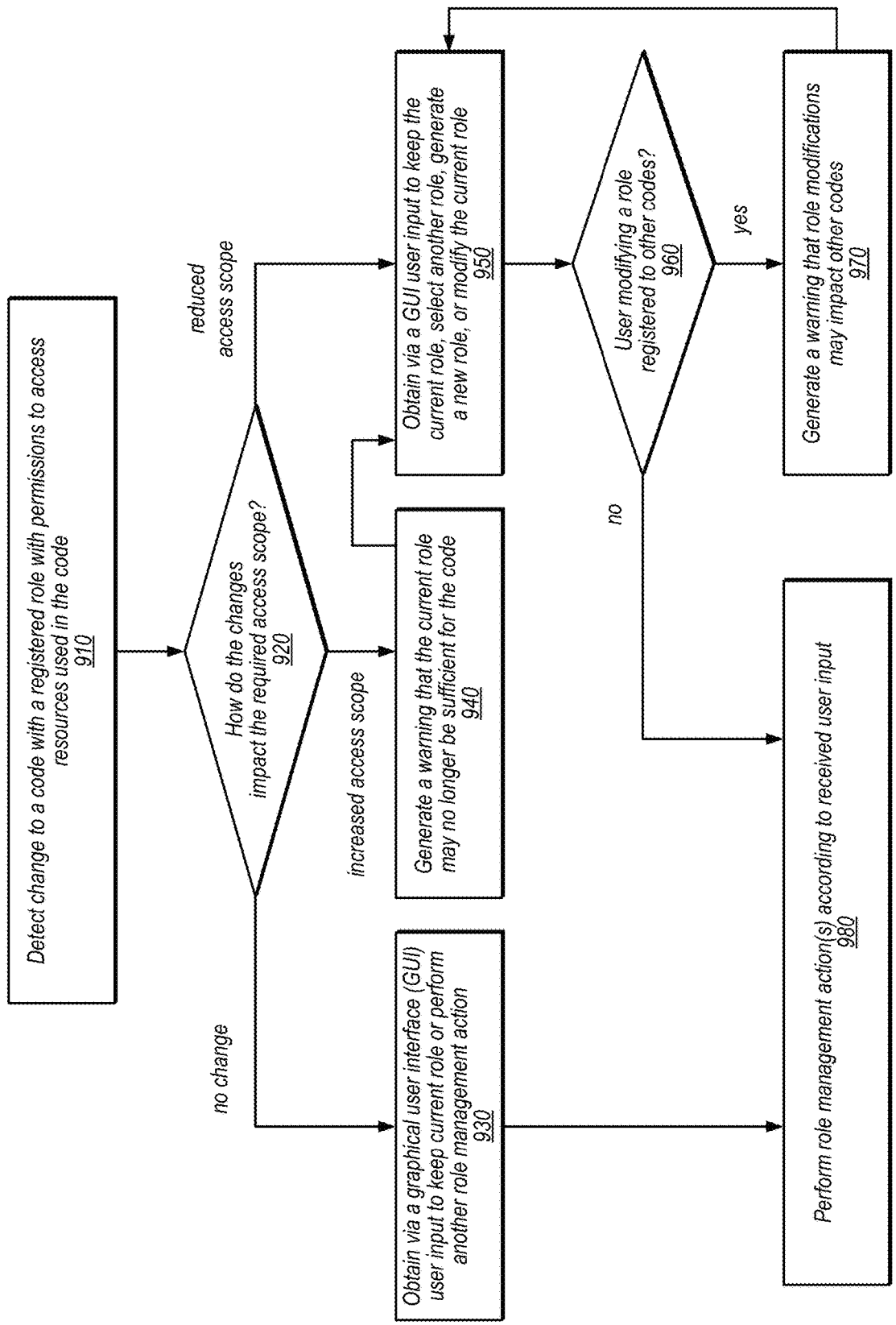
FIG. 9 is a flow diagram illustrating a process of using a GUI to perform role management actions for a code that has been modified, according to some embodiments.

FIG. 9 is a flow diagram illustrating a process of using a GUI to perform role management actions for a code that has been modified, according to some embodiments. In some embodiments, the process depicted in the figure may be performed by, for example, the user interface 140 of FIG. 1, or the user interfaces shown in FIGS. 6A to 6D.

At operation 910, a change to a code is detected. The code may be code 120 of FIG. 1, and may be registered with a current role with permissions to access resources used in the code. In some embodiments, the change may be detected in response to a user input, for example to analyze, validate, or compile the code, after the code has been edited. The analysis of the code may be performed in similar fashion as discussed in connection with operations 720, 730, 740, and 750 of FIG. 7. Based on the analysis, at operation 920, a determination is made how the code changes impact the required access scope for the code. Depending on how the required access scope has changed, the process may perform a number of different role management actions, as shown.

If there are no changes to the access scope of the code, at operation 930, the process may obtain user input from a GUI specifying whether to keep the current role for the code or perform another role management action. In some embodiments, the GUI may be similar to the GUI 630 shown in FIG. 6B or 6C. For example, the GUI may also allow a user to make modifications to the current role associated with the code. In some embodiments, even though the code's access scope has not changed, the user may still use the GUI to perform certain desired role management actions.

If the code changes have increased the code's access scope, at operation 940, a warning is generated to indicate to the user that the current role may no longer be sufficient for the code. For example, such a warning may be provided before the code changes are saved, or before the user exits a code editing session. In some embodiments, the warning may also include one or more recommended role management actions to perform, for example, to modify the current role in a recommended manner, or to assign a different role to the code. In some embodiments, a user may select one or more of the recommended role management actions, which may take the process to operation 950, as shown.

If the code changes have reduced the code's access scope, at operation 950, user input is obtained from the GUI specifying to keep the current role for the code, to generate a new role for the code, or to modify the current role. In some embodiments, one or more of these role management actions may be recommended to the user, depending on the situation or one or more policies of the role manager, as discussed in connection with FIG. 5B. In some embodiments, depending on the user's selection of a particular role management action, the GUI may allow the user to specify further information to carry out the management action. For example, the GUI may allow the user to specify a role name for a new role, or changes to an existing role.

At operation 960, a determination is made whether the user is electing to modify a role that is also registered to other codes. In some embodiments, this determination may be made by checking a role registry (e.g. registry 530) that may be maintained by or as part of role manager. As discussed, in some embodiments, a single role may be used for (and registered to) multiple code segments. If the user is elect to modify a role that is shared by multiple code segments, at operation 970, a warning is generated to indicate to the user that the modifications to the role may impact other codes. In some embodiments, the warning may list the other code segments that rely on the role. The process then loops back to operation 950, where the user may make adjustments to the desired role management action in light of the warning. Otherwise, the process may simply proceed to operation 980.

At operation 980, the role management action(s) selected by the user are performed according to received user input. For example, the role management actions may include one or more of generating a new role for the code, assigning a different role to the code, or modifying the current role, the new role, or another role assigned to the code. In some embodiments, the role management actions may be performed via one or more interactions with the IAM system, in similar fashion as discussed in connection with FIG. 5B.

Figure 10:
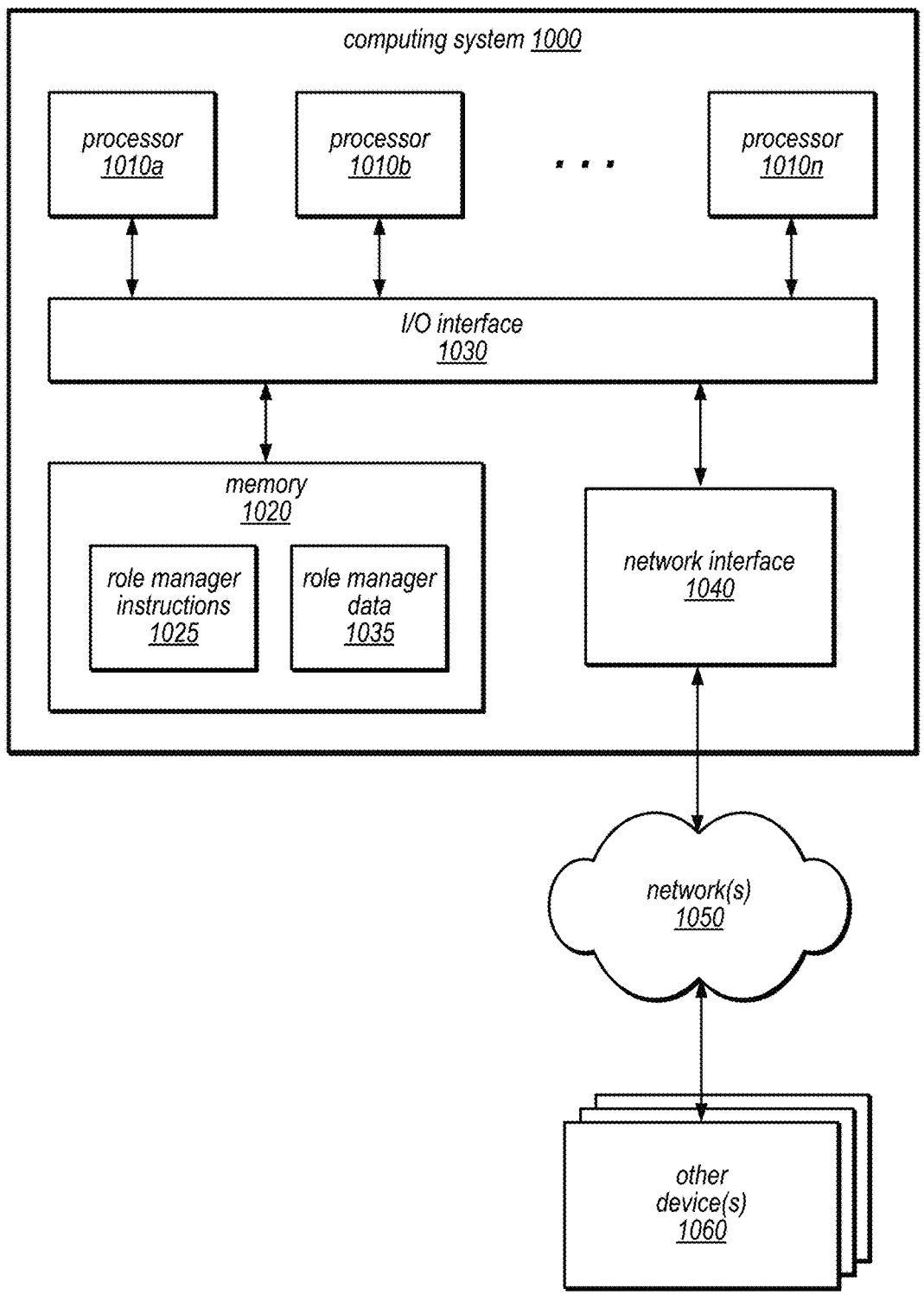
FIG. 10 is a block diagram illustrating an example computer system that can be used to implement a role management system that automatically manages roles with permissions for executing code, according to some embodiments.

FIG. 10 is a block diagram illustrating an example computer system that can be used to implement a role management system that automatically manages roles with permissions for executing code, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1026. In some embodiments, the code 1025 may include program instructions (e.g. software modules or libraries) that implement one or more functions of the role manager 130 of FIG. 1. In some embodiments, the data 1026 may include data maintained by the role manager 130 (e.g., the access policy templates 136 or the role registry 530). The system memory 1020 may include different levels of cache, some of which may be located on the CPU and some away from the CPU. One level of the cache hierarchy may be a last level cache that is shared by all of the processors 1010*a* to 1010*n*. The last level cache may be an inclusive cache of the low levels of cache in the cache hierarchy.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
an identity and access management (IAM) system configured to store roles that are granted respective permissions for accessing resources; and
one or more computers that implement a role manager, configured to:
detect one or more changes made to a code segment via a graphical user interface (GUI), wherein the code segment is registered with a role in the IAM system with permissions to access resources used in the code segment;
analyze the code segment to determine that the one or more changes alters a resource access scope of the code segment, and in response:
generate, via the GUI, a warning indicating that the resource access scope of the code segment has been altered;
receive, via the GUI, user input indicating a role management action to change the role registered to the code segment; and
send one or more requests to the IAM system to change the role according to the user input.

2. The system of claim 1, wherein the role management action modifies one or more permissions in the role.

3. The system of claim 1, wherein the role management action generates a new role in the IAM system for the code segment.

4. The system of claim 1, wherein the role management action registers a different role in the IAM system to the code segment.

5. The system of claim 1, wherein the role manager is configured to include in the warning a list of role management actions, and the user input is a selection of one of the role management actions in the list.

6. The system of claim 1, wherein the role manager is configured to generate the warning before the one or more changes to the code segment are saved or before an exit of a code editing session.

7. The system of claim 1, wherein the one or more changes reduces the resource access scope of the code segment, and the change to the role reduces permissions granted to the role.

8. The system of claim 1, wherein the role manager is configured to:
detect that the role is registered to another code segment; and
generate, via the GUI, another warning indicating that the role management action impacts the other code segment.

9. The system of claim 1, wherein the role manager is configured to:
detect that the role is no longer registered to any code segments; and
automatically delete the role from the IAM systems.

10. The system of claim 1, wherein to analyze the code segment, the role manager is configured to:
parse the code segment to identify one or more resources accessed by the code segment.

11. The system of claim 1, wherein the role manager is implemented as part of a code authoring system, and the GUI is a code editing interface of the code authoring system.

12. The system of claim 1, wherein the code segment accesses resources provided by a network-accessible service provider network that provisions and hosts virtual computing resources for a plurality of clients.

13. The system of claim 12, wherein:
the role manager is implemented as part of a code authoring system for editing code executable in a workflow orchestration service of the network-accessible service provider network.

14. The system of claim 13, wherein:
the code segment is part of a definition of a state machine;
the code segment specifies one or more actions to perform to transition from one state to another state in the state machine; and
the workflow orchestration service is a serverless execution service configured to execute the state machine.

15. A method, comprising:
performing, via one or more computers that implement a role manager:
detecting one or more changes made to a code segment via a graphical user interface (GUI), wherein the code segment is registered with a role with permissions to access resources used in the code segment;
analyzing the one or more changes to determine that the one or more changes alters a resource access scope of the code segment, and in response:
generating, via the GUI, a warning indicating that the resource access scope of the code segment has been altered;
receiving, via the GUI, user input indicating a role management action to change the role registered to the code segment; and
causing the role to be changed according to the user input.

16. The method of claim 15, wherein the warning includes a list of role management actions, and the user input is a selection of one of the role management actions in the list.

17. The method of claim 15, wherein the one or more changes reduces the resource access scope of the code segment, and the change to the role reduces permissions granted to the role.

18. The method of claim 15, further comprising the role manager:

detecting that the role is registered to another code segment; and generating, via the GUI, another warning indicating that the role management action impacts the other code segment.

19. The system of claim 1, further comprising the role manager:

detecting that the role is no longer registered to any code segments; and automatically deleting the role in response to the detection that the role is no longer registered to any code segments.

20. One or more non-transitory computer-accessible storage media storing program instructions that when executed on or across one or more processors implement a role manager and cause the role manager to:

detect one or more changes made to a code segment via a graphical user interface (GUI), wherein the code segment is registered with a role with permissions to access resources used in the code segment;

analyze the code segment to determine that the one or more changes alters a resource access scope of the code segment, and in response:

generate, via the GUI, a warning indicating that the resource access scope of the code segment has been altered;

receive, via the GUI, user input indicating a role management action to change the role registered to the code segment; and cause the role to be changed according to the user input.

* * * * *